US011862915B2

(12) United States Patent
Nakamura et al.

(10) Patent No.: US 11,862,915 B2
(45) Date of Patent: Jan. 2, 2024

(54) JOINED CONDUCTOR, CONDUCTOR JOINING DEVICE, METHOD FOR MANUFACTURING JOINED CONDUCTOR, AND CONDUCTOR JOINING METHOD

(71) Applicants: FURUKAWA ELECTRIC CO., LTD., Tokyo (JP); FURUKAWA AUTOMOTIVE SYSTEMS INC., Inukami-gun (JP)

(72) Inventors: Toshihiro Nakamura, Tokyo (JP); Tomohiro Nakayama, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 705 days.

(21) Appl. No.: 17/066,672

(22) Filed: Oct. 9, 2020

(65) Prior Publication Data

US 2021/0028562 A1    Jan. 28, 2021

Related U.S. Application Data

(63) Continuation of application No. PCT/JP2019/015756, filed on Apr. 11, 2019.

(30) Foreign Application Priority Data

Apr. 11, 2018   (JP) ................ 2018-076386
Apr. 11, 2018   (JP) ................ 2018-076425

(51) Int. Cl.
*H01B 7/10*     (2006.01)
*H01R 4/02*     (2006.01)
(Continued)

(52) U.S. Cl.
CPC ........... *H01R 4/021* (2013.01); *B23K 20/106* (2013.01); *H01B 7/108* (2013.01); *H01R 4/625* (2013.01);
(Continued)

(58) Field of Classification Search
CPC .... H01B 7/108; H01R 4/625; H01R 43/0207; B23K 2101/38; B23K 20/10
See application file for complete search history.

(56) References Cited

U.S. PATENT DOCUMENTS

2008/0128471 A1    6/2008  Eberbach et al.
2011/0155701 A1    6/2011  Gerst et al.
(Continued)

FOREIGN PATENT DOCUMENTS

CN    102143823 A    8/2011
CN    105555461 A    5/2016
(Continued)

OTHER PUBLICATIONS

International Search Report dated May 28, 2019 in PCT/JP2019/015756 filed Apr. 11, 2019 (with English translation), 5 pages.
(Continued)

*Primary Examiner* — Sherman Ng
(74) *Attorney, Agent, or Firm* — Oblon, McClelland, Maier & Neustadt, L.L.P.

(57) ABSTRACT

[Object]
The present invention provides a joined conductor and a method for manufacturing a joined conductor that can improve electrical conductivity between conductors.
[Solution]
In a joined conductor 100 including a joining portion 110 in which a plurality of conductors exposed portions 220 arranged along a longitudinal direction X are fused and joined, the joining portion 110 is configured to have a
(Continued)

substantially rectangular shape in an orthogonal cross section orthogonal to the longitudinal direction X, and among a pair of side surfaces in width direction 120 and a pair of side surfaces in up-down direction 130 configured such that a first surface 121 and a second surface 122 that face each other in the orthogonal cross section, and a horn 131 and a horn 132 are paired, on each of the first surface 121 and the second surface 122 of the pair of side surfaces in width direction 120 that are at least one pair, a corrugated portion 140 that has a corrugated shape and in which a ridge 141 protruding outward and a valley 142 recessed inward are alternately continuously provided along the longitudinal direction X is formed.

12 Claims, 16 Drawing Sheets

(51) Int. Cl.
*B23K 20/10* (2006.01)
*H01R 4/62* (2006.01)
*H01R 43/02* (2006.01)
*B23K 103/10* (2006.01)
*B23K 103/12* (2006.01)

(52) U.S. Cl.
CPC ...... *H01R 43/0207* (2013.01); *B23K 2103/10* (2018.08); *B23K 2103/12* (2018.08)

(56) References Cited

U.S. PATENT DOCUMENTS

| | | | | |
|---|---|---|---|---|
| 2012/0000069 | A1* | 1/2012 | Hagi | H01R 43/28 29/864 |
| 2012/0111629 | A1* | 5/2012 | Patrikios | H01R 4/029 228/110.1 |
| 2013/0233591 | A1* | 9/2013 | Terasaka | H01B 13/0023 174/117 R |
| 2014/0311798 | A1* | 10/2014 | Numata | H02G 15/06 174/75 R |
| 2016/0136753 | A1 | 5/2016 | Ruhl et al. | |

FOREIGN PATENT DOCUMENTS

| | | |
|---|---|---|
| EP | 2 549 591 A1 | 1/2013 |
| JP | 2004-220933 A | 8/2004 |
| JP | 2007-149421 A | 6/2007 |
| JP | 2007-185706 A | 7/2007 |
| JP | 2008-528299 A | 7/2008 |
| JP | 2010-218796 A | 9/2010 |
| JP | 2010-251287 A | 11/2010 |
| JP | 2011-198506 A | 10/2011 |
| JP | 2014-75245 A | 4/2014 |
| JP | 2015-167957 A | 9/2015 |
| JP | 2016-185009 A | 10/2016 |
| WO | WO 2012/060466 A1 | 5/2012 |

OTHER PUBLICATIONS

Office Action dated Jan. 21, 2022 in corresponding Chinese Patent Application No. 201980024957.0 (with English Translation), 21 pages.
Combined Chinese Office Action and Search Report dated May 27, 2021 in Patent Application No. 201980024957.0 (with English language translation), 22 pages.
Notice of Reasons for Refusal dated Jan. 11, 2022 in Japanese Patent Application No. 2018-076425 (with English language translation), 11 pages.
Japanese Office Action dated Aug. 31, 2021 in Japanese Patent Application No. 2018-076386 (with English translation), 11 pages.

* cited by examiner

FIG. 2A
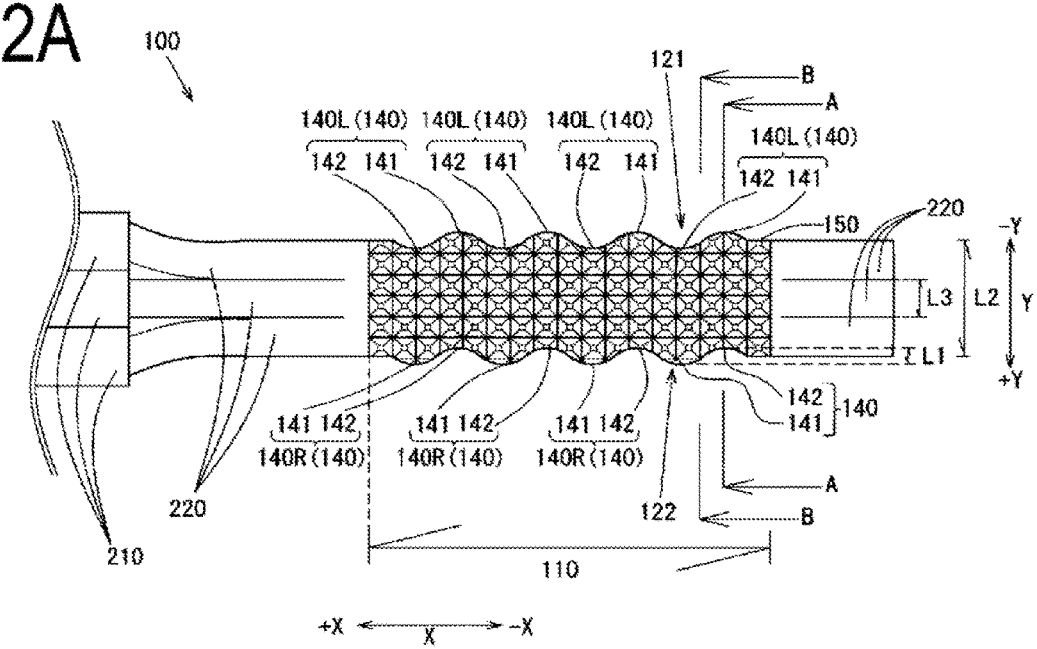
FIG. 2B
FIG. 2C
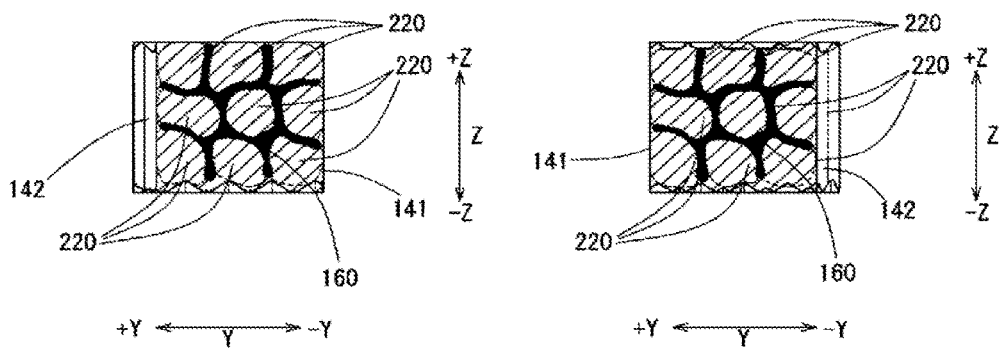

JOINED CONDUCTOR, CONDUCTOR JOINING DEVICE, METHOD FOR MANUFACTURING JOINED CONDUCTOR, AND CONDUCTOR JOINING METHOD

CROSS-REFERENCE TO RELATED APPLICATIONS

The present application is a continuation application of International Application No. PCT/JP2019/015756, filed Apr. 11, 2019, which claims priority to Japanese Patent Application No. 2018-076386 filed Apr. 11, 2018 and Japanese Patent Application No. 2018-076425 filed Apr. 11, 2018. The contents of these applications are incorporated herein by reference in their entirety.

TECHNICAL FIELD

The present invention relates to, for example, a joined conductor in which conductors are fused and joined and a conductor joining device configured to electrically conductively fuse and join conductors to be routed on a vehicle or the like, a method for manufacturing the joined conductor in which the conductors are fused and joined, and a conductor joining method.

BACKGROUND ART

Nowadays, various electrical devices that improve operability and comfort are mounted in an automobile, and such electrical devices are electrically connected to each other by wire harnesses or the like that are routed in an automobile to transmit and receive a signal or to supply power.

A plurality of insulated wires that configure the wire harness can be made to be electrically conductive by a joined conductor obtained by exposing conductors covered with insulating coverings and joining them to each other.

Such a joined conductor is manufactured by, for example, in a state where a plurality of conductors are regulated at a predetermined width, ultrasonically joining the conductors while pressurizing the conductors from a thickness direction (up-down direction) (see Patent Document 1).

CITATION LIST

Patent Document

Patent Document 1: JP 2011-198506 A

SUMMARY OF INVENTION

Technical Problem

However, the joined conductor disclosed in Patent Document 1 has a tendency where the conductors adjacent to each other in the up-down direction are joined at sufficient strength, but joining strength between the conductors adjacent to each other in a left-right direction is weaker than the joining strength in the up-down direction.

In consideration of the problem described above, an object of the present invention is to provide a joined conductor that can improve joining strength between conductors and improve electrical conductivity and a conductor joining device that can improve joining strength between conductors, and a method for manufacturing a joined conductor.

Solution to Problem

The present invention relates to a joined conductor including a joining portion in which a plurality of conductors arranged along a longitudinal direction are fused and joined, wherein the joining portion is provided with a first surface and a second surface that face each other along the longitudinal direction, and at least one of the first surface and the second surface is provided with a corrugated portion in which a convex line portion protruding outward in a facing direction in which the first surface and the second surface face each other, and a concave line portion recessed inward in the facing direction are continuously provided along the longitudinal direction.

The present invention also relates to a method for manufacturing a joined conductor in which a plurality of conductors arranged along a longitudinal direction are fused and joined, the method including the steps of, when a direction orthogonal to the longitudinal direction is referred to as a first direction, and a direction orthogonal to the longitudinal direction and the first direction is referred to as a second direction, compressing that compresses the conductors along the first direction and regulates movement of the conductors in the second direction, and welding that performs ultrasonic welding of the conductors compressed in the first direction by ultrasonic oscillation, wherein the compressing includes the step of regulating movement of the conductors in the second direction such that a corrugated portion is formed along the longitudinal direction on a first surface provided on a conductor bundle configured of the plurality of the conductors that are arranged, and the corrugated portion is continuously provided with a convex line portion protruding outward in the second direction and a concave line portion recessed inward in the second direction.

The conductors include a stranded wire formed by twisting wires having electrical conductivity together, a conductor formed of a solid wire, a conductor in which wires are bundled, and the like, and the conductors may be made of any material as long as the conductors have electrical conductivity, and examples of the conductors include a copper-based conductor made of copper or copper alloy, and an aluminum-based conductor made of aluminum, aluminum alloy, or the like.

The conductors include, for example, an exposed conductor exposed by cutting and peeling off an insulating covering forming an outer layer at one end of an insulated wire formed by covering a stranded wire or a bundle of wires with the insulating covering having insulation properties, a stranded wire conductor covered with no insulating covering, a conductor in which wires are bundled, and the like.

The plurality of conductors described above may include conductors configured of the same type or different types of conductors. Specifically, each of the conductors may have a different outer diameter or material, and some of them may be stranded wires and some of them may be solid wires.

The ridges protruding outward in the facing direction described above may protrude outward in the facing direction relatively with respect to the valleys, and similarly, being recessed inward in the facing direction described above may be a configuration in which the valleys are recessed inward in the facing direction relatively with respect to the ridges.

The corrugated portion may be formed on an entire surface of the side surface or may be formed on a part of the side surface.

Further, the corrugated portion is configured in a manner that at least one or more of the ridges and at least one or more of the valleys are continuous along the longitudinal direction, and note that as long as the ridges and valleys are continuous, the number of ridges and the number of valleys do not need to be coincident.

According to the present invention, it is possible to improve joining strength between the conductors and improve electrical conductivity.

Specifically, since the corrugated portion is formed on at least the first surface among the facing surfaces, the conductors aligned and arranged in the facing direction among the plurality of conductors configuring the joining portion are joined in contact with other conductors that are adjacent in the facing direction along a direction intersecting the longitudinal direction. Therefore, in the joining portion, the joining strength between the conductors arranged in the facing direction is improved.

Accordingly, integrity of the joining portion can be improved, the electrical conductivity of the conductors configuring the joined conductor can be improved, and rigidity of the joined conductor can also be improved.

Further, as an aspect of the present invention, the corrugated portions may be provided on the first surface and the second surface, and the convex line portion on the first surface may face the concave line portion on the second surface, and the concave line portion on the first surface may face the convex line portion on the second surface.

According to the present invention, the first corrugated portion formed on the first surface and the second corrugated portion formed on the second surface are configured so as to be deviated from each other by a half wavelength, so that the joining portion is joined in a state where the conductors aligned and arranged in the facing direction oscillate with a constant width in the facing direction. Therefore, an apparent cross-sectional coefficient of the entire joining portion can be improved, and the rigidity of the joined conductor can be improved.

In addition, since widths between the first surface and the second surface with respect to the facing direction are constant in the longitudinal direction, that is, since cross-sectional areas of the conductors in the longitudinal direction are constant, unevenness in rigidity of the joining portion can be suppressed, and variations in quality of the joined conductor can be suppressed.

Additionally, as an aspect of the present invention, a plurality of the corrugated portions may be provided along the longitudinal direction.

The above-described case where the plurality of corrugated portions are provided along the longitudinal direction may be a case where the plurality of corrugated portions are continuously provided or a case where a part formed in a planar shape may be interposed between the plurality of corrugated portions.

According to the present invention, in the joining portion in which the conductors periodically aligned and arranged in an intersecting direction that intersects the longitudinal direction are joined, the joining strength between the conductors aligned and arranged in the intersecting direction can be improved, and a contact area between the conductors can be increased. Therefore, the integrity of the joining portion can be further improved, and the electrical conductivity and the rigidity of the conductors can be further improved.

Additionally, as an aspect of the present invention, a height from a bottom of the concave line portion to a vertex of the convex line portion may be configured to be less than or equal to 0.5 times an interval between the first surface and the second surface.

According to the present invention, the electrical conductivity of the joined conductor can be improved and the rigidity can be reliably improved.

Specifically, when a height of the ridge with respect to the valley is higher than 0.5 times the interval between the first surface and the second surface in the facing direction, amplitude of a corrugated shape in the joining portion increases, and a load applied to the conductors increases. As a result, there is a risk that the conductors are partially ruptured or damaged, and there are risks that the electrical conductivity of the joined conductor cannot be sufficiently ensured, and the rigidity declines.

In contrast, by configuring the height of the ridge with respect to the valley in the facing direction so as to be less than or equal to 0.5 times the interval between the first surface and the second surface in the facing direction, the load of the conductors configuring the joining portion can be reduced, and the conductors aligned in the facing direction can be oscillated in the facing direction, so that the joining strength between the conductors due to bending can be reliably improved, and the contact area between the conductors can be increased.

As a result, the integrity of the joining portion can be improved, and a possibility that the conductors are partially ruptured or damaged can be reduced, and the electrical conductivity of the joined conductor can be sufficiently improved, and the rigidity can be reliably improved.

Additionally, as an aspect of the present invention, a height from a bottom of the concave line portion to a vertex of the convex line portion may be configured to be equal to or more than 0.5 times a minimum diameter of the plurality of conductors that are arranged.

According to the present invention, the electrical conductivity of the joined conductor can be improved.

Specifically, when a height of the ridge with respect to the valley in the facing direction is lower than 0.5 times the minimum diameter of the plurality of conductors that are arranged, since an amplitude amount of a corrugated shape formed by the ridge and the valley in the joining portion is small, and the conductors arranged along the facing direction are not arranged so as to intersect with each other with respect to the longitudinal direction, the integrity of the joining portion cannot be sufficiently improved, and the electrical conductivity of the joined conductor cannot be sufficiently improved.

In contrast, by making the height of the ridge with respect to the valley in the facing direction be equal to or more than 0.5 times the minimum diameter of the plurality of conductors that are arranged, the joining portion can be reliably bent along the ridge and the valley, so that the conductors arranged along the facing direction are arranged so as to intersect with each other with respect to the longitudinal direction. As a result, the joining strength between the conductors can be reliably improved, the contact area between the conductors can be increased, and the electrical conductivity of the joined conductor can be improved.

Further, as an aspect of the present invention, the joining portion may have a planar portion formed in a planar shape along the longitudinal direction between a tip thereof and the corrugated portion.

Examples of the above-described case of forming in the planar shape include a case where the planar shape is formed parallel to one of side surfaces of the joining portion or a case where the planar shape is inclined with respect to the side surface. In other words, it indicates a shape in which an intended concave-convex shape is not provided on the side surface between the tip of the joining portion and the corrugated portion.

According to the present invention, it is possible to suppress peel-off of the joining between the conductors from a tip side of the joining portion. Specifically, the ridge and the valley that configure the corrugated portion are configured by bending the conductors, so when an external force acts on an opposite side to a bending direction, the joining between the conductors is easily peeled off.

However, since the joining portion has the planar portion between the tip and the corrugated portion, it is possible to prevent an unintended external force on the opposite side to the bending direction from acting directly on the ridge or the valley, and even when an unintended external force is applied, the external force can be absorbed by the planar portion, and therefore, the peel-off of the jointing between the conductors can be suppressed.

As an aspect of the present invention, the joining portion may be configured with an ultrasonic joining portion formed by ultrasonic welding.

According to the present invention, an interface between the conductors in the joining portion can be joined by the ultrasonic welding, so sufficient joining can be performed even inside the joined conductor. As a result, the joining strength of the joined conductor can be stabilized. Furthermore, change in physical properties caused by excessive heat is suppressed and, therefore, mixing of foreign objects can be prevented. Accordingly, the electrical conductivity and the rigidity of the joined conductor can be stabilized.

Additionally, as an aspect of the present invention, the conductors may be made of aluminum or aluminum alloy.

According to the present invention, it is possible to reduce a weight of the joined conductor.

Further, as an aspect of the present invention, the joining portion may be provided with a third surface intersecting the first surface and the second surface along the longitudinal direction, and may include an intersecting-side corrugated portion in which an intersecting-side convex line portion protruding outward in an intersecting direction that intersects the facing direction, and an intersecting-side concave line portion recessed inward in the facing direction may be continuously provided along the longitudinal direction on the third surface.

According to the present invention, not only does a contact area between the conductors arranged along the facing direction increase and does the joining strength increase, but also the contact area between the conductors arranged along the intersecting direction can be increased. Therefore, the joining strength of the joined conductor can be further improved. Furthermore, the integrity of the joined conductor can be further improved, so the electrical conductivity of the joined conductor can be further improved.

Moreover, a plurality of insulated wires configuring the wire harness can be made electrically conductive by a joined conductor obtained by exposing end portions of conductors from insulating coverings and joining them to each other, for example. Conventionally, a conductor joining device that conductively joins such conductors to each other has been proposed.

For example, Patent Document 1 discloses a conductor joining device arranges a plurality of conductors in a conductor arrangement space formed by a pair of regulating portions arranged to face each other at a predetermined interval in a width direction and an anvil and a horn arranged so as to face each other in an up-down direction between the pair of regulating portions, compresses the conductors by moving the horn toward the anvil while regulating movement of the conductors in the width direction by the regulating portions, and makes the horn ultrasonically oscillate along an insertion direction of the conductors to fuse and join the conductors to each other, and it is said that the device can manufacture a joined conductor in which the conductors can be electrically connected to each other.

However, there is a problem that the joined conductor manufactured by the conductor joining device disclosed in Patent Document 1 has sufficient joining strength between the conductors arranged in the up-down direction, but does not have sufficient joining strength between the conductors arranged along the width direction.

As an invention to solve such a problem, a conductor joining device for joining a plurality of conductors by ultrasonic welding is provided, the conductor joining device includes a horn having a contact surface that is brought into contact with the conductors and configured to ultrasonically oscillate, an anvil configured to relatively move in a movement direction of approaching to or separating from the contact surface, and a pair of regulating portions configured to be in contact with the contact surface and configured to be relatively movable along the contact surface, wherein the pair of regulating portions have regulating surfaces facing each other, and in a case where a direction in which a pair of the regulating surfaces face each other is referred to as a facing direction and a direction orthogonal to the movement direction is referred to as an orthogonal direction, on at least one of the regulating surfaces, a corrugated regulating portion in which a convex portion protruding toward the other regulating surface facing the one regulating surface, and a concave portion recessed in a direction opposite to a protruding direction of the convex portion are continuously provided along the orthogonal direction is formed, an engaging concave portion and an engaging convex portion configured to engage with the convex portion and the concave portion are provided along the orthogonal direction on a main surface facing in the facing direction of the anvil, at least one of the pair of regulating portions with respect to the anvil moves toward the other of the pair of regulating portions so as to sandwich the anvil between the regulating portions facing each other, and the horn relatively moves with respect to the anvil.

Further, the present invention includes the steps of arranging a plurality of conductors in a space formed by a horn having a contact surface that is brought into contact with the conductors and configured to ultrasonically oscillate, and a pair of regulating portions configured to be in contact with the contact surface, arranged so as to face each other at a predetermined interval, and configured to relatively move along the contact surface, relatively moving the horn and the pair of regulating portions with respect to an anvil arranged at a predetermined interval with respect to the contact surface and moving at least one of the pair of regulating portions toward the other of the regulating portions so as to sandwich the anvil between the pair of regulating portions facing each other, and compressing the conductors by the anvil and the horn with the pair of regulating portions sandwiching the anvil, and performing ultrasonic welding of the conductors compressed by the anvil and the horn by making the horn ultrasonically oscillate, wherein, on each of regulating surfaces facing each other in the pair of regulating portions, a corrugated regulating portion in which a convex portion protruding toward the other regulating surface facing the regulating surface, and a concave portion recessed in a direction opposite to a protruding direction of the convex portion are continuously provided along a facing direction in which the pair of regulating portions face each other and an orthogonal direction orthogonal to a movement direction in which the horn relatively moves with respect to the anvil is formed, and an engaging concave portion and an engaging convex portion configured to engage with the convex portion and the concave portion are provided on a main surface facing in the facing direction of the anvil.

The plurality of conductors described above may include conductors configured of the same type or different types of conductors. Specifically, each of the conductors may have a different outer diameter or material, and some of them may be stranded wires and some of them may be solid wires.

In addition, the plurality of conductors described above include a configuration in which a joining part is surrounded with a copper tube, copper foil, or the like, for example.

The corrugated regulating portion has a configuration in which at least one or more convex portions and at least one or more concave portions are continuous along the orthogonal direction. Note that as long as one or more the convex portions and one or more the concave portions are continuous, it is not necessary that the number of convex portions and the number of concave portions are coincident.

Note that the corrugated regulating portion may be formed on an entire surface of the regulating surface, or may be formed on a part of the regulating surface.

The convex portion protruding toward the other facing regulating surface described above and the concave portion recessed in the direction opposite to the protruding direction of the convex portion may be configured such that the convex portion and the concave portion protrude outward or be recessed inward relative to each other.

Examples of the corrugated shape include a case where a corrugated shape formed by the convex portion and the concave portion is a sine wave or a square wave, and a case of a corrugated shape formed by a ridge and a valley of a square wave whose corners are chamfered.

The present invention can improve the joining strength between the conductors.

Specifically, the horn relatively moves with respect to the anvil by forming the corrugated regulating portion having the corrugated shape on the regulating surface and providing the engaging convex portion and the engaging concave portion formed on the anvil so as to be capable of engaging with the corrugated regulating portion, so that the plurality of conductors that are arranged are compressed by the anvil and the horn.

In addition, since the regulating portions move inward in the facing direction according to the relative movement of the horn, the regulating portions can regulate movement of the conductors outward in the facing direction, and can bend the conductors into the corrugated shape that goes up and down in a sine curve manner (hereinafter referred to as "oscillate") with respect to the facing direction toward the orthogonal direction.

By bending the conductors into the corrugated shape that oscillates with respect to the facing direction in this manner, the conductors aligned and arranged along the facing direction can be brought into contact with each other along a direction that intersects the orthogonal direction along with approaching one side in the orthogonal direction, and therefore, the conductors can be reliably brought into contact with each other. Thus, by joining the conductors together by ultrasonic welding, the joining strength between the conductors arranged along the facing direction can also be increased, and the integrity of the joined conductor can be improved.

Accordingly, the electrical conductivity and the joining strength of the joined conductor can be improved. In addition, since the joining strength between the conductors is improved, the rigidity of the manufactured joined conductor as a whole can also be improved.

As an aspect of the present invention, the corrugated regulating portion may be formed in a sine wave shape.

According to the present invention, end portions in the facing direction of the space formed by the horn, the regulating portions, and the anvil are formed in a circular arc shape, so it is possible to form a corrugated shape in which the conductors are bent in the circular arc shape along the orthogonal direction. As a result, the conductors arranged in the facing direction can be continuously brought into contact with each other, the conductors can be reliably brought into contact with each other, and the joining strength can be increased. In addition, it is possible to prevent a corner part in which the joining becomes weak from being formed in the joined conductor during compression and ultrasonic welding.

Furthermore, since the corrugated regulating portions can form the conductors in a smooth corrugated shape along the orthogonal direction, it is possible to prevent a corner of the convex portion from abutting on the conductors and cutting the conductors, as in a case where the convex portion is formed in a rectangular shape, and it is possible to reliably improve the electrical conductivity between the conductors and the rigidity of the joined conductor.

Additionally, as an aspect of the present invention, a plurality of the corrugated regulating portions may be provided along the orthogonal direction.

According to the present invention, since the conductors can be bent into the corrugated shape that periodically repeatedly oscillates with respect to the facing direction toward one side in the orthogonal direction, the conductors aligned and arranged in the facing direction can be periodically brought into contact with each other in a direction that intersects the orthogonal direction, and the conductors can be more reliably brought into contact with each other.

Thus, the joining strength can be further improved by ultrasonically joining the conductors. Therefore, the integrity of the joining part of the conductors can be further improved, and the electrical conductivity of the joined conductor can be further improved.

Further, as an aspect of the present invention, the corrugated regulating portions may be formed on both regulating surfaces that face each other in the pair of regulating portions, and the corrugated regulating portion formed on one of the regulating surfaces may be referred to as a first corrugated regulating portion, the corrugated regulating portion formed on the other corrugated regulating portion may be referred to as a second corrugated regulating portion, the first corrugated regulating portion and the second corrugated regulating portion may be configured to have the same corrugated shape, and a convex portion of the first corrugated regulating portion may face a concave portion of the second corrugated regulating portion, and a concave portion of the first corrugated regulating portion may face a convex portion of the second corrugated regulating portion.

According to the present invention, the first corrugated regulating portion and the second corrugated regulating portion are configured to be deviated by a half wavelength, so that the joined conductor bent by the first corrugated regulating portion and the second corrugated regulating portion is formed in a corrugated shape that oscillates in the facing direction toward one side of the orthogonal direction with a predetermined width with respect to the facing direction. Therefore, an apparent cross-sectional coefficient of the joined conductor ultrasonically welded can be improved, and the rigidity of the joined conductor can be improved.

In addition, since a width between side surfaces in the joined conductor along the facing direction becomes a predetermined value, imbalance in contact area and joining strength between the conductors in the orthogonal direction can be suppressed. Accordingly, the electrical conductivity and the joining strength of the joined conductor can be stabilized.

Further, as an aspect of the present invention, a flat portion formed so as to be flat along the orthogonal direction may be provided on a tip side of the regulating surface in the orthogonal direction in the regulating portion.

Examples of the above-described case where the flat portion is formed so as to be flat include a case where the flat portion is formed parallel to the regulating surface or a case where the flat portion is inclined with respect to the regulating surface. In other words, it indicates a shape in which an intended concave-convex shape is not provided on the facing surface on the tip side of the regulating surface.

According to the present invention, it is possible to form the tip side of the joined conductor in a planar shape, and it is possible to suppress the peel-off of the joining between the conductors from the tip side.

Specifically, in a bending part bent into the corrugated shape in the joined conductor, the joining between the conductors is easily peeled off in a case where an unintended external force acts on the opposite side to the bending direction. Further, when the tip side of the joined conductor is formed in the corrugated shape, an unintended external force on the opposite side to the bending direction may act on the tip portion with the corrugated shape.

In contrast, by providing the flat portion on the tip side in the orthogonal direction of the regulating surface, the tip side of the joined conductor can be formed in the planar shape, and it is possible to prevent an unintended external force on the opposite side to the bending direction from acting directly on the bending part bent in the corrugated shape in the joined conductor. Further, even when an unintended external force acts on the tip part of the joined conductor, the tip part formed on the planar surface can absorb the external force, so it is possible to suppress the peel-off of the joining between the conductors.

Additionally, as an aspect of the present invention, the horn may ultrasonically oscillate along a direction in which the pair of regulating portions face each other or along a direction intersecting a direction in which the horn and the anvil face each other.

The above-described intersecting direction is not limited to the orthogonal direction orthogonal to the facing direction in which the pair of regulating portions face each other and the movement direction in which the horn and the anvil relatively move, and may include a direction intersecting the orthogonal direction.

The present invention enables the conductors to be efficiently joined.

Specifically, by compression of the conductors arranged in the conductor arrangement space by the horn and the anvil, an external force along the movement direction (a compressing direction) acts on contact surfaces between the conductors arranged in the movement direction, so an oxide film or the like on a metal surface is reliably removed by ultrasonic oscillation, and the conductors are easily welded due to interatomic forces of attraction of metal configuring the conductors.

Furthermore, by the corrugated regulating portions, the conductors are formed in the corrugated shape that oscillates in the facing direction toward the orthogonal direction, so that the conductors aligned in the facing direction are brought into contact with each other in the direction intersecting the orthogonal direction.

Therefore, by ultrasonic oscillation that oscillates in the orthogonal direction or the facing direction, as for the conductors aligned and arranged in the facing direction and configured to be in contact with each other in the direction intersecting the orthogonal direction, an oxide film or the like on a metal surface is reliably removed, and the conductors are easily welded due to interatomic forces of attraction of metal configuring the conductors. As a result, the conductors aligned in the movement direction or in the facing direction can be efficiently and reliably joined.

As another aspect of the present invention, a control unit may be provided that synchronizes relative movement of the horn and the regulating portions with respect to the anvil and movement of at least one of the pair of regulating portions with respect to the other.

According to the present invention, when the movement of the horn and the regulating portions in the compressing direction and the movement of the pair of regulating portions in the facing direction are synchronized, the anvil and the pair of regulating portions can be brought into contact with each other before the anvil and the horn compress the conductors, and thus the conductors can be reliably prevented from being caught in a gap formed between the anvil and the pair of regulating portions.

Further, as an aspect of the present invention, in the anvil, a compression-side corrugated portion that has a corrugated shape and in which a compression-side convex portion and a compression-side concave portion formed in the same shapes as the convex portion and the concave portion are continuously provided along the facing direction may be provided on at least one of a facing contact surface that faces the contact surface and the contact surface.

According to the present invention, the conductors can be bent into a corrugated shape that oscillates with respect to the movement direction toward one side in the orthogonal direction, so that the conductors can be more reliably brought into contact with each other in the facing direction and the movement direction, and the joining strength can be further improved. Therefore, the integrity of the joined conductor can be further improved, and the electrical conductivity and the joining strength of the joined conductor can be further improved.

Advantageous Effects of Invention

According to the present invention, it is possible to provide a joined conductor that can improve joining strength between conductors and improve electrical conductivity and a conductor joining device that can improve joining strength between conductors, and a method for manufacturing a joined conductor.

BRIEF DESCRIPTION OF DRAWINGS

FIGS. 2A to 2C are explanatory diagrams of the joined conductor.

DESCRIPTION OF EMBODIMENTS

An embodiment of a joined conductor 100 and a conductor joining device 1 for manufacturing the joined conductor 100 according to the present invention will be described with reference to the following drawings.

Figure 1:
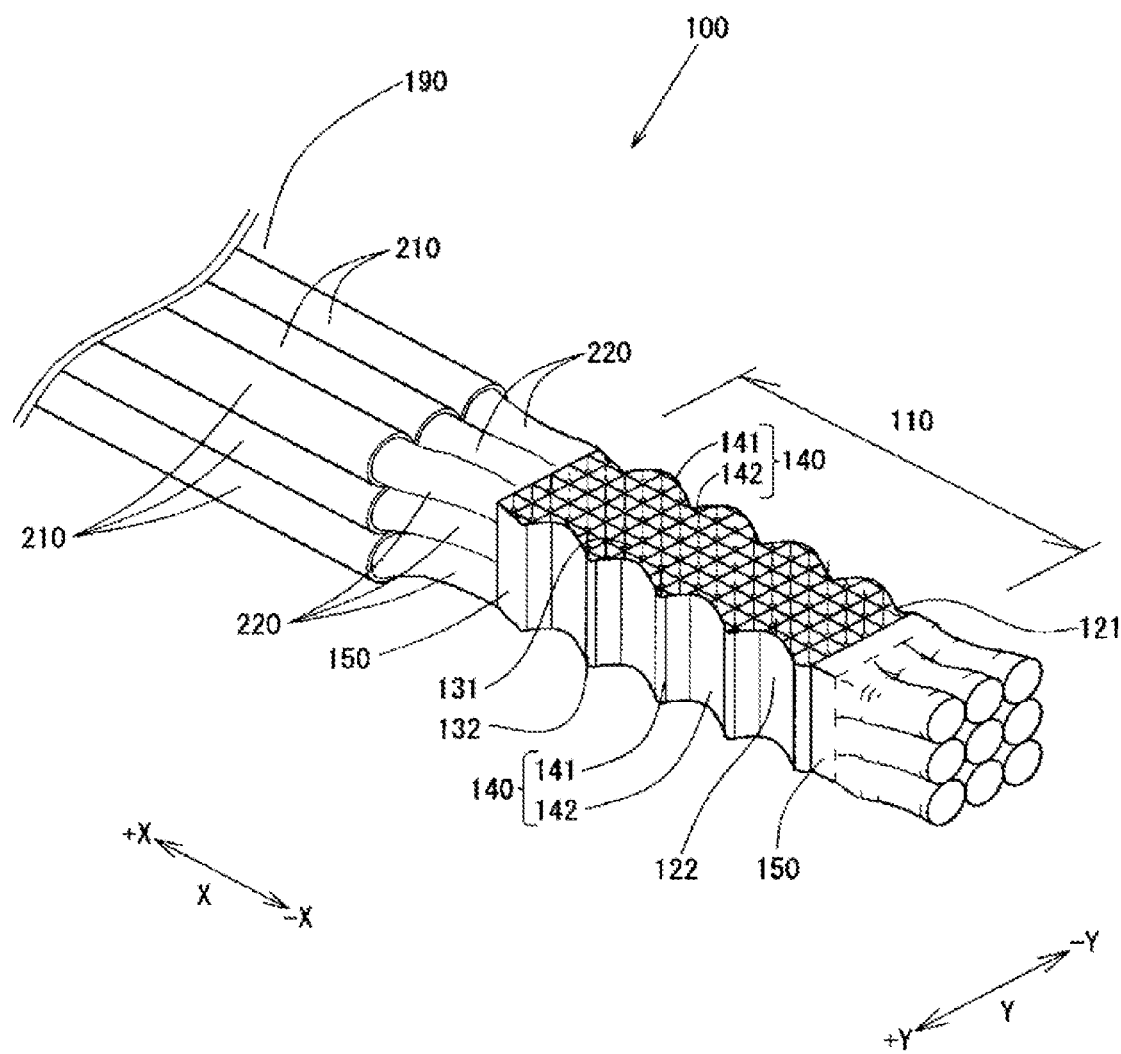
FIG. 1 is a schematic perspective view of a joined conductor.

FIG. 1 illustrates a schematic perspective view of the joined conductor 100, and FIGS. 2A to 2C illustrate explanatory diagrams of the joined conductor 100. Specifically, FIG. 2A illustrates an enlarged plan view of a joining portion 110 in the joined conductor 100, FIG. 2B illustrates a cross-sectional view taken along an A-A line in FIG. 2A, and FIG. 2C illustrates a cross-sectional view taken along a B-B line in FIG. 2A.

Figure 3:
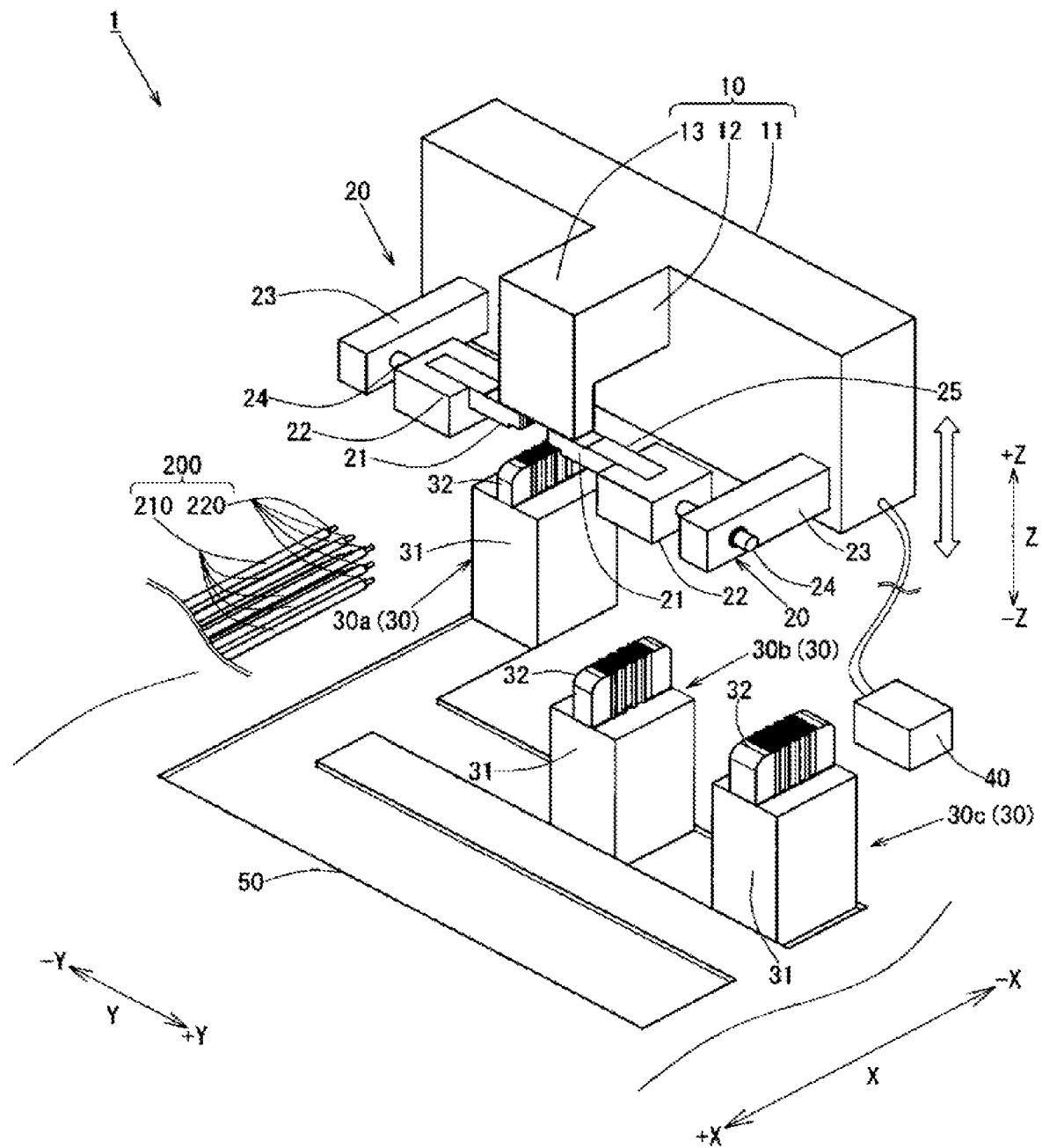
FIG. 3 is a schematic perspective view of a conductor joining device.
Figure 4:
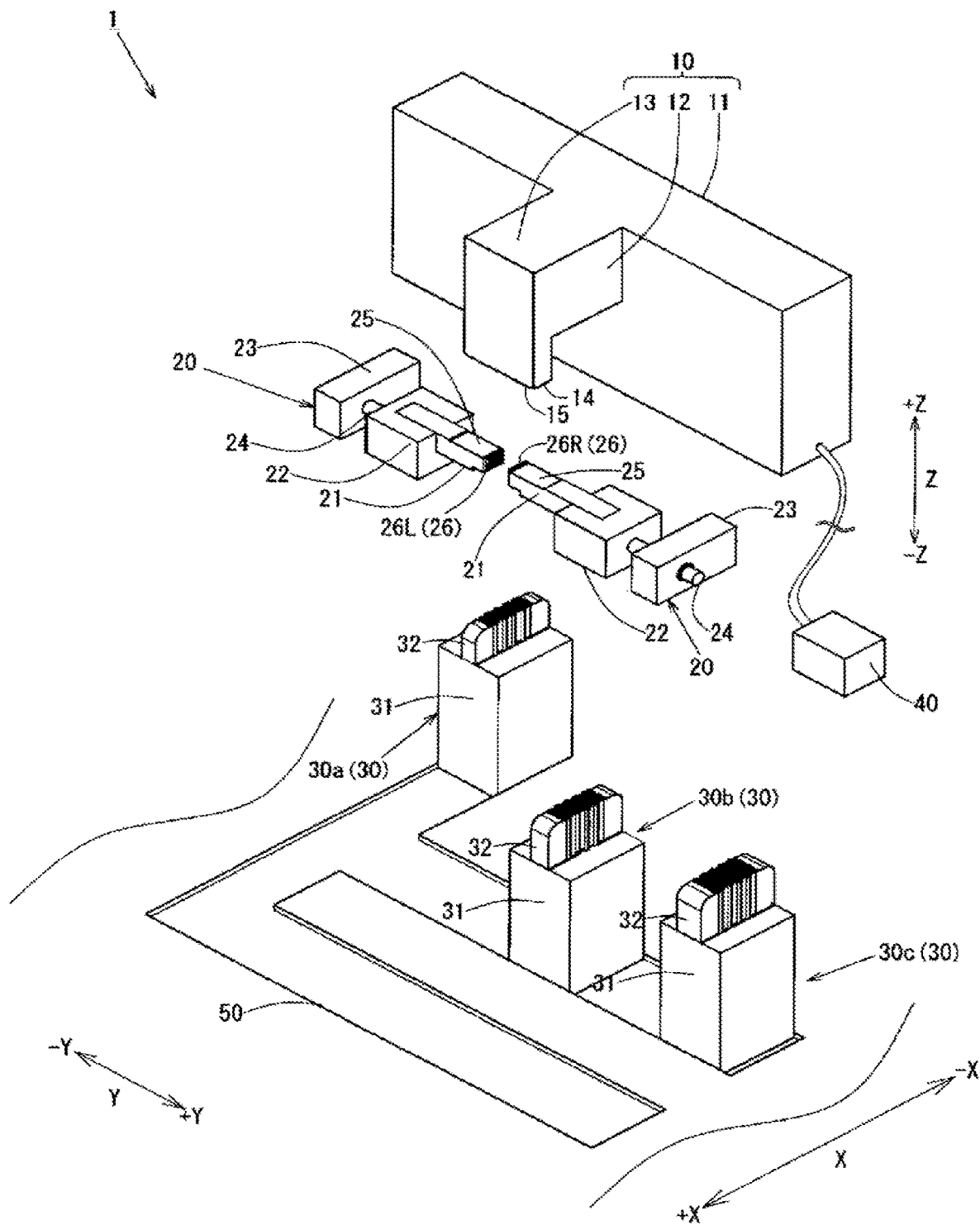
FIG. 4 is a schematic exploded perspective view of the conductor joining device.
Figure 5A:
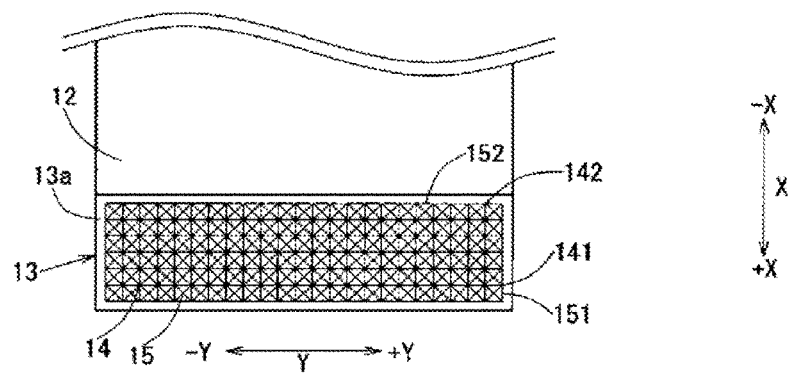
FIGS. 5A to 5C are explanatory diagrams of a horn.
Figure 5B:
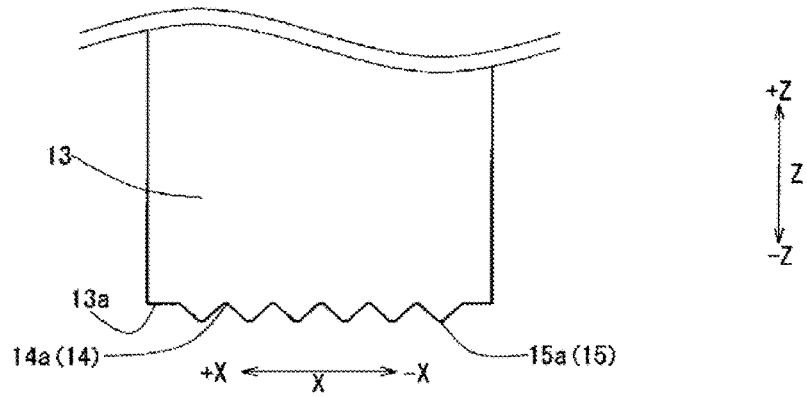
Figure 5C:
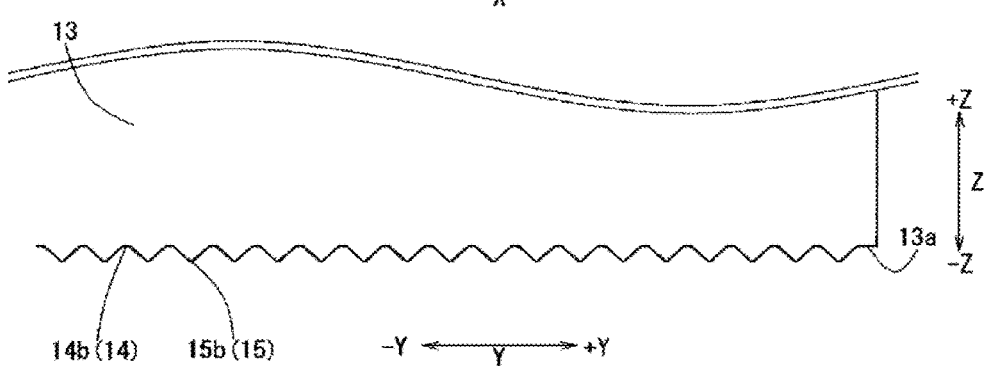
Figure 6A:
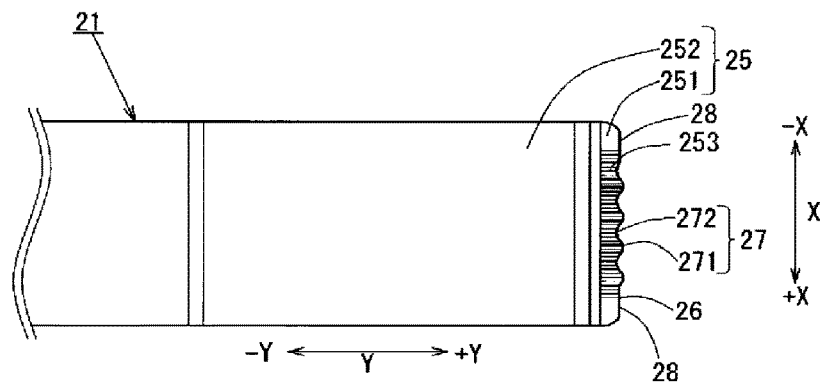
FIGS. 6A to 6C are explanatory diagrams of a regulating portion.
Figure 6B:
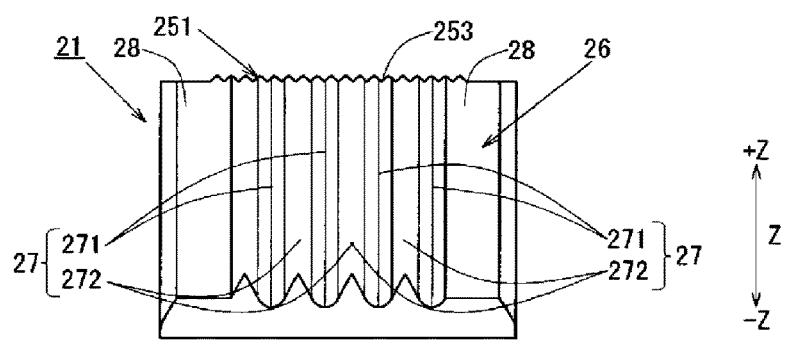
Figure 6C:
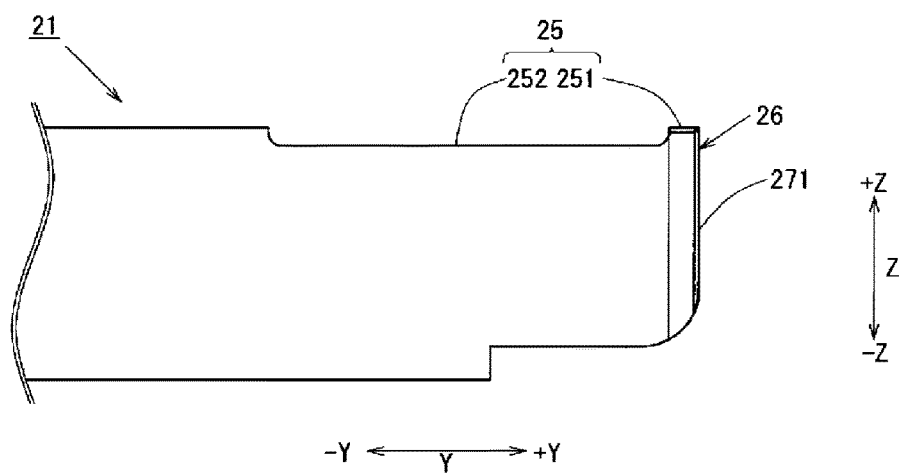
Figure 7A:
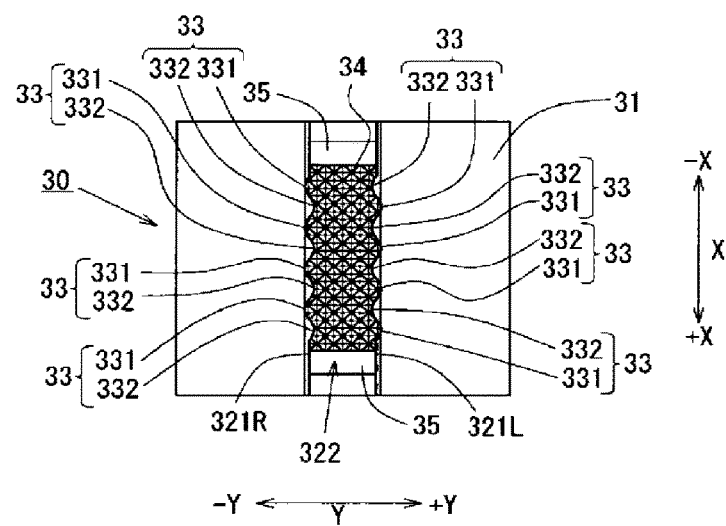
FIGS. 7A and 7B are explanatory diagrams of an anvil.
Figure 7B:
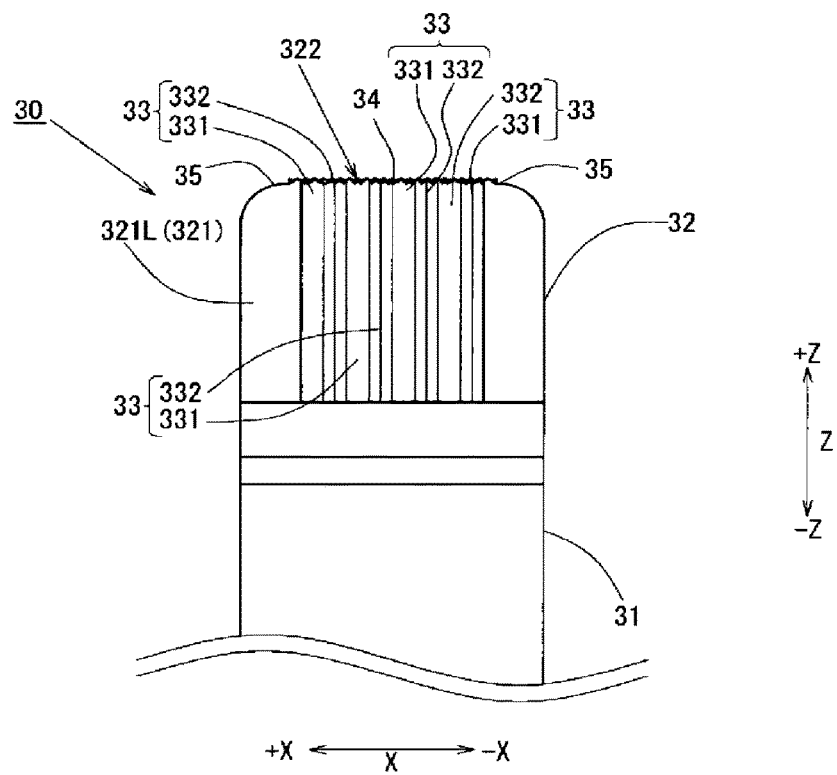
Figure 8A:
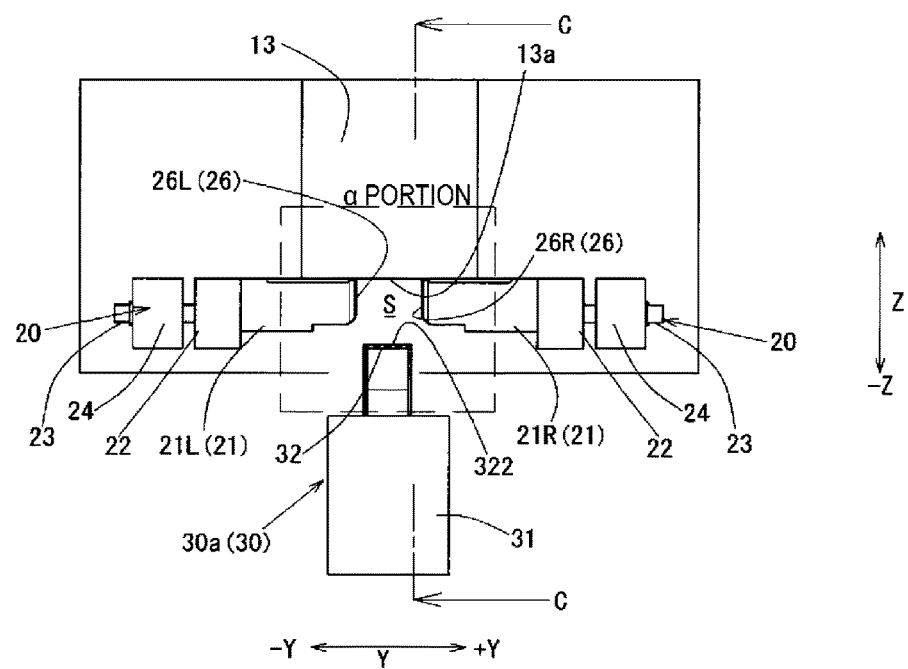
FIGS. 8A and 8B are explanatory diagrams of a conductor joining device.
Figure 8B:
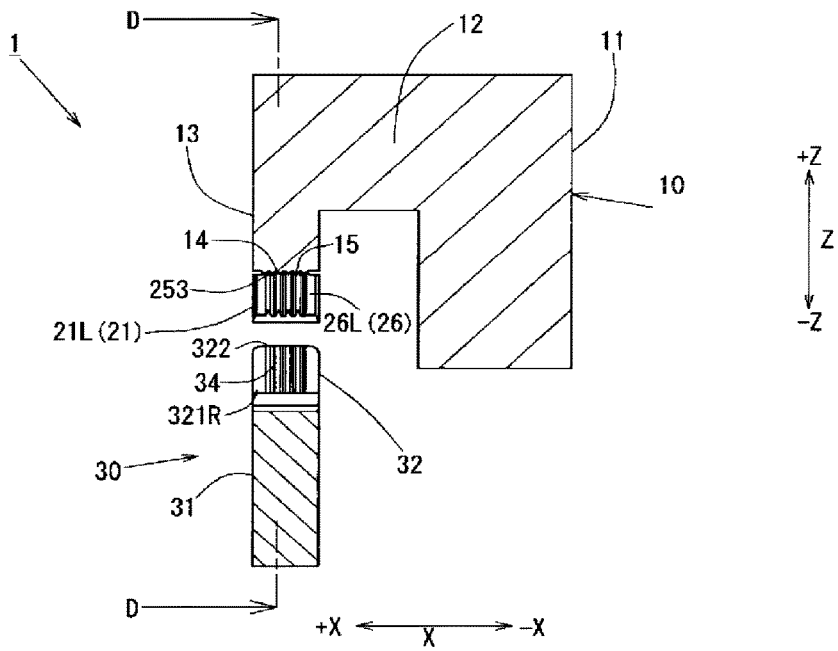

FIG. 3 is a schematic perspective view of the conductor joining device 1, FIG. 4 is a schematic exploded perspective view of the conductor joining device 1, FIGS. 5A to 5C are explanatory diagrams of a horn 13 configuring the conductor joining device 1, FIGS. 6A to 6C are explanatory diagrams of a regulating portion 21 configuring the conductor joining device 1, FIGS. 7A and 7B are explanatory diagrams of an anvil 30 configuring the conductor joining device 1, and FIGS. 8A and 8B are explanatory diagrams for explaining a configuration of the conductor joining device 1.

Here, in FIG. 3, a longitudinal direction of insulated wires 200 is indicated as a longitudinal direction X, a direction that is a lateral width direction of the insulated wires 200 and that is orthogonal to the longitudinal direction X is indicated as a width direction Y, a left side along the longitudinal direction X in FIG. 3 is indicated as a +X direction, and a right side is indicated as a −X direction, and a left side along the width direction Y is indicated as a −Y direction, and a right side is indicated as a +Y direction.

In addition, in FIG. 3, a vertical direction is indicated as an up-down direction Z, and an upper side in FIG. 3 is indicated as a +Z direction (upward) and a lower side is indicated as a −Z direction (downward).

Referring to FIGS. 5A to 5C in details, FIG. 5A illustrates an enlarged bottom view of a bottom surface of the horn 13, FIG. 5B illustrates an enlarged side view of the horn 13 as viewed from a +Y side, and FIG. 5C illustrates an enlarged front view of the horn 13 as viewed from a +X side. Note that FIGS. 5B and 5C illustrate only a part of the horn 13 in an enlarged manner.

FIGS. 6A to 6C and FIGS. 7A and 7B will be described in details. FIG. 6A illustrates an enlarged plan view of an upper surface of the regulating portion 21, FIG. 6B illustrates an enlarged side view of the regulating portion 21 as viewed from the +Y side, and FIG. 6C is an enlarged front view of the regulating portion 21 as viewed from the +X side. Note that FIGS. 6A and 6C illustrate only a part of the regulating portion 21 in an enlarged manner. FIG. 7A illustrates a plan view of the anvil 30, and FIG. 7B illustrates an enlarged side view of an anvil upper portion 32 erected in the anvil 30, as viewed from the +Y side.

Also, FIGS. 8A and 8B will be described in details. FIG. 8A illustrates a schematic front view of parts that join conductor exposed portions 220 in the conductor joining device 1 as viewed from the +X direction, and FIG. 8B illustrates a cross-sectional view taken along a C-C line in FIG. 8A.

The joined conductor 100 is a conductor in which the conductor exposed portions 220 which are tip portions of a plurality of insulated wires 200 are joined and integrated by ultrasonic welding, and is used to electrically connect electrical devices such as batteries to each other.

The insulated wire 200 is configured by covering a stranded wire conductor formed by twisting wires made of aluminum alloy together with an insulating covering 210 made of insulating resin, and the insulated wire 200 is provided with, on a tip side thereof, the conductor exposed portion 220 where the stranded wire conductor is exposed by peeling the insulating covering 210 by a predetermined length (see FIG. 3).

Note that the stranded wire conductor may be made of any material having electrical conductivity, and may be formed by twisting wires made of, for example, aluminum, copper, copper alloy, or the like, together. In addition, the conductor exposed portion 220 is not necessarily configured of the stranded wire conductor, and may be configured by bundling wires having electrical conductivity.

The joined conductor 100 has a configuration in which a plurality (nine in the present embodiment) of insulated wires 200 are bundled along the longitudinal direction X, and a plurality of conductor exposed portions 220 which are exposed by peeling off the insulating coverings 210 on the tip side (−X side) of the insulated wires 200 are bundled, fused and joined as a conductor bundle, and the tip portion of the joined conductor 100 has the joining portion 110 formed by fusing and joining the conductor exposed portions 220.

As illustrated in FIG. 1 and FIGS. 2A to 2C, the joining portion 110 is configured in a rectangular shape in cross-section with a first surface 121 (which is a surface formed on a left side (−Y side)) and a second surface 122 (which is a surface formed on a right side (Y side)) that face each other in the width direction Y, and a third surface 131 (which is a surface formed on a lower side (−Z side)) and a fourth surface 132 (which is a surface formed on an upper side (+Z side)) that face each other in the up-down direction Z, and a planar portion 150 formed in a planar shape is provided at each of end portions of the joining portion 110 on the +X side and the −X side.

On the first surface 121 and the second surface 122, corrugated portions 140 formed in a sine wave shape along the longitudinal direction X are formed in a plan view (see FIG. 2A).

The corrugated portion 140 is continuously configured with a ridge 141 that protrudes outward along the width direction Y, and a valley 142 that is recessed inward along the width direction Y.

A height L1 of a top of the ridge 141 with respect to a bottom of the valley 142 is configured to be about 0.20 times a distance between the first surface 121 and the second surface 122, that is, a length L2 of a width in the joined conductor 100.

In the present embodiment, the height L1 is 0.20 times the length L2, but this value is not necessarily required, and may be changed as appropriate. Note that from the perspective of electrical conductivity and rigidity, the value is preferably equal to or less than 0.5 times.

Also, the height L1 of the top of the ridge 141 with respect to the bottom of the valley 142 is configured to be approximately 0.6 times a diameter L3 that is the minimum diameter of the conductor exposed portions 220 configuring the joining portion 110.

In the present embodiment, the height L1 is 0.6 times the diameter L3, but this value is not necessarily required, and may be changed as appropriate. Note that from the perspective of electrical conductivity, the height L1 is preferably equal to or more than 0.5 times a diameter of wires, and more preferably equal to or more than 0.5 times an outer diameter of the stranded wire conductor. In addition, in the present embodiment, all nine conductor exposed portions 220 have the same diameter, but some or all of the conductor exposed portions 220 may have different diameters. In this case, the height L1 is preferably equal to or more than 0.5 times the diameter L3 that is the minimum diameter of the conductor exposed portions 220.

Among the corrugated portions 140 configured in this manner, corrugated portions 140L provided on the first surface 121 are aligned and provided in four rows such that the valleys 142 and the ridges 141 are arranged in an alternately continuous manner from the +X side.

On the other hand, corrugated portions 140R provided on the second surface 122 among the corrugated portions 140 are aligned and provided in four rows such that the ridges 141 and the valleys 142 are arranged in an alternately continuous manner from the +X side.

In other words, the valleys 142 and the ridges 141 arranged on the first surface 121 are arranged so as to face the ridges 141 and valleys 142 arranged on the second surface 122 along the width direction Y. In other words, the corrugated portions 140L and the corrugated portions 140R are provided on the first surface 121 and the second surface 122, respectively, in such a manner that sine waves having the same shape each other are deviated by a half wavelength along the longitudinal direction X.

As illustrated in FIGS. 2B and 2C, the joining portion 110 configured in this manner repeats periodically from a state where the cross-sectional shape protrudes toward the −Y side to a state where the cross-sectional shape protrudes toward the +Y side from the −X side toward the +X side. As a result, an apparent cross-sectional coefficient of the joining portion 110 is improved, so rigidity of the joining portion 110 is improved.

Furthermore, as will be described below, the conductor joining device 1 performs ultrasonic welding for the joined conductor 100, and thus an ultrasonic joining portion 160 is formed at an interface between the conductors in a cross section of the joining portion 110.

Furthermore, the joining portion 110 includes the planar portion 150 between the corrugated portion 140 arranged at a tip and an end portion on the tip side in the longitudinal direction X, and includes the planar portion 150 between the corrugated portion 140 arranged at a base end and an end portion on the base end side in the longitudinal direction X.

Specifically, as illustrated in FIG. 1 and FIG. 2A, the planar portions 150 are formed so as to protrude in a planar shape toward the −X side and the +X side. In other words, the corrugated portions 140 are arranged at positions separated by a predetermined interval from the tip of the joined conductor 100.

Next, the conductor joining device 1 that manufactures the joined conductor 100 by joining the conductor exposed portions 220 on a tip side that are exposed from the insulated wires 200 will be described with reference to FIG. 3 to FIGS. 8A and 8B.

As illustrated in FIG. 3, the conductor joining device 1 is configured to perform ultrasonic welding (ultrasonic metal joining) on the conductor exposed portions 220 exposed from a tip side of a plurality of insulated wires 200, and is configured with an ultrasonic welding tool 10 configured to move up and down in the up-down direction Z, a pair of width direction adjustment portions 20 fixed to the ultrasonic welding tool 10 on a +X direction side thereof, a plurality of anvils 30 configured to compress the conductor exposed portions 220 with the ultrasonic welding tool 10 that moves down, and a control unit 40 configured to control movement of the ultrasonic welding tool 10 and the width direction adjustment portions 20.

The ultrasonic welding tool 10 is configured with a lifting portion 11 that rises and lowers in the up-down direction Z by using a lifting motor (not illustrated), a horn support portion 12 protruding from a central portion of the lifting portion 11 toward the +X direction side, and the horn 13 extending downward from an end surface on +X direction side of the horn support portion 12.

The lifting motor is controlled by the control unit 40.

As illustrated in FIG. 3 and FIG. 4, the horn support portion 12 protrudes from the central portion of the lifting portion 11 toward the +X direction side, and is configured to support the horn 13 on the lifting portion 11.

Note that in the present embodiment, the horn support portion 12 protrudes from the lifting portion 11 along the longitudinal direction X, but does not necessarily protrude along the longitudinal direction X, and may be configured to protrude along the width direction Y, for example. That is, in the present embodiment, a protruding direction of the horn support portion 12 is configured so as to be orthogonal to the movement direction of the regulating portions 21 to be described below, but may also be configured so as to be along the movement direction of the regulating portions 21.

The horn 13 extends downward from the end surface on the +X direction side of the horn support portion 12 and is configured to ultrasonically oscillate along the longitudinal direction X by being connected to an ultrasonic oscillator (not illustrated).

In addition, as illustrated in FIG. 5A, on a horn-side lower surface 13a that is a bottom surface of the horn 13, a plurality of horn-side concave portions 14 formed by being recessed upward, and a plurality of horn-side convex portions 15 formed by being protruded downward are provided in a lattice pattern along the longitudinal direction X and the width direction Y. That is, the bottom surface of the horn 13 is formed to have a concave-convex shape as viewed from the longitudinal direction X and the width direction Y (see FIGS. 5B and 5C).

Specifically, the horn-side concave portion 14 is configured of a horn valley in longitudinal direction 14a (see FIG. 5B) formed by being recessed upward from the horn-side lower surface 13a, and a horn valley in width direction 14b (see FIG. 5C) formed by being recessed upward from the horn-side lower surface 13a, and is formed at an intersecting portion thereof.

Also, the horn-side convex portion 15 is configured of a horn ridge in longitudinal direction 15a (see FIG. 5B) that protrudes downward from the horn-side lower surface 13*a* between the horn valleys in longitudinal direction 14*a* formed along the longitudinal direction X, and a horn ridge in width direction 15*b* (see FIG. 5C) that protrudes downward from the horn-side lower surface 13*a* between the horn valleys in width direction 14*b* formed along the width direction Y, and is formed at an intersecting portion thereof.

The horn valleys in longitudinal direction 14*a* and the horn ridges in longitudinal direction 15*a* are arrayed in five rows and six rows, respectively, at equal intervals along the width direction Y, and the horn ridges in width direction 15*b* and the horn valleys in width direction 14*b* are arrayed in 23 rows and 24 rows, respectively, at equal intervals along the longitudinal direction X (refer to FIG. 5A). The horn-side concave portions 14 and the horn-side convex portions 15 arranged in this manner are formed so as to have a twill line shape when viewed from the bottom surface.

Each of the pair of width direction adjustment portions 20 arranged so as to face each other on the +X direction side of the ultrasonic welding tool 10 includes the regulating portion 21 that regulates movement of the insulated wires 200 in the width direction Y, a fixing and support portion 22 that fixes and supports the regulating portion 21, a fixing portion 23 that indirectly fixes the regulating portion 21 to the lifting portion 11, and a connecting portion 24 that movably connects the fixing and support portion 22 to the fixing portion 23.

The regulating portions 21 are arranged with a predetermined interval along the width direction, and each of them is configured such that a length thereof along the longitudinal direction X is equal to a length of the corresponding horn 13, and a height in the up-down direction Z is sufficiently longer than three times the outer diameter of the conductor exposed portion 220, and is provided with a regulating surface 26 that faces the other facing regulating portion 21, as illustrated in FIG. 3 and FIG. 4.

Note that, in the present embodiment, the regulating portion 21 has a height that is sufficiently long compared to three times the outer diameter of the conductor exposed portion 220, it is not necessary for the height to be three times the outer diameter of the conductor exposed portion 220, and thus the regulating portion 21 may be formed so as to have a height that is sufficiently longer than a total outer diameter of a bundle of electric wires formed by the plurality of conductor exposed portions 220 that are to be subjected to ultrasonic welding.

A movement assist portion for regulation 25 that engages with the horn-side concave portions 14 and the horn-side convex portions 15 to assist movement of the regulating portion 21 in the width direction Y is formed on an upper end surface of the regulating portion 21.

The movement assist portion for regulation 25 is configured of a movement assist portion 251 slightly protruding upward from an upper end side of the regulating surface 26 and an upper surface concave portion 252 formed by being recessed downward on the outer side in the width direction Y of the movement assist portion 251. In addition, in the movement assist portion 251, a plurality of regulating portion-side convex portions 253 protruding upward are aligned along the longitudinal direction X.

The regulating portion-side concave portions 253 are configured such that a height thereof is approximately one half of a height of the horn valley in longitudinal direction 14*a* and the horn ridge in longitudinal direction 15*a*, and a width formed by three regulating portion-side concave portions 253 is slightly smaller than a width of the horn ridge in longitudinal direction 15*a* (horn valley in longitudinal direction 14*a*), and 18 regulating portion-side concave portions 253 are aligned at equal intervals along the longitudinal direction X so as to correspond to the horn valleys in longitudinal direction 14*a* and the horn ridges in longitudinal direction 15*a*.

The regulating portion-side concave portions 253 configured in this manner can absorb amplitude in the longitudinal direction X due to ultrasonic oscillation by providing slight gaps between the horn valleys in longitudinal direction 14*a* and the horn ridges in longitudinal direction 15*a* in a state in which the horn 13 and the regulating portions 21 are in engagement.

As illustrated in FIG. 6A, each of the regulating surfaces 26 provided on facing portions of the pair of regulating portions 21 is provided with a corrugated regulating portion 27 having a sine wave shape in a plan view, and flat portions 28 formed so as to be flat at both ends in the longitudinal direction X of the corrugated regulating portion 27.

The corrugated regulating portion 27 is configured such that a regulating portion-side convex portion 271 that protrudes by a predetermined height toward a side of the facing regulating surface 26, and a regulating portion-side concave portion 272 that is recessed so as to have the same depth as the height of the regulating portion-side convex portion 271 in a direction opposite to a protruding direction of the regulating portion-side convex portion 271 are alternately smoothly continuous (see FIG. 6A). Note that in the corrugated regulating portion 27, four regulating portion-side convex portions 271 and four regulating portion-side concave portions 272 are arranged so as to be alternately continuous along the longitudinal direction X.

In each of the corrugated regulating portions 27 provided on each of the facing regulating surfaces 26, the regulating portion-side convex portion 271 and the regulating portion-side concave portion 272 are arranged so as to face the regulating portion-side concave portion 272 and the regulating portion-side convex portion 271 provided on the other facing regulating surface 26.

In other words, a corrugated shape formed by the regulating portion-side convex portions 271 and the regulating portion-side concave portions 272 on the regulating surface 26 on the +Y side (hereinafter referred to as a regulating surface 26R) and a corrugated shape formed by the regulating portion-side convex portions 271 and the regulating portion-side concave portions 272 on the regulating surface 26 on the +Y side (hereinafter referred to as a regulating surface 26L) are formed so as to be deviated by a half wavelength from each other.

In the present embodiment, each of the number of the regulating portion-side convex portions 271 and the number of the regulating portion-side concave portions 272 formed on the regulating surface 26 is four, but the present invention is not limited to this number, and according to a method for use, shapes, and sizes of the conductor joining device 1, the number can be appropriately adjusted.

The flat portion 28 is a planar surface formed in a flat shape along the up-down direction Z and the longitudinal direction X on each end side in the longitudinal direction X of the corrugated regulating portion 27.

As illustrated in FIG. 3 and FIG. 4, the outer side of the regulating portion 21 configured in this manner is fixed by being engaged with the fixing and support portion 22.

As illustrated in FIG. 3 and FIG. 4, the connecting portion 24 is a rod-like body that penetrates through the fixing portion 23 fixed to the lifting portion 11 along the width direction Y, and that is fixed at one end to the fixing and support portion 22, and is configured to be movable along the width direction Y by using a motor for movement in the width direction (not illustrated) that is controlled by the control unit 40.

That is, the connecting portion 24 connects the fixing and support portion 22 and the fixing portion 23, and allows the fixing and support portion 22 fixed with the regulating portion 21 to be moved along the width direction Y with respect to the fixing portion 23.

Note that the fixing portion 23 is fixed to the lifting portion 11, so that the regulating portion 21 and the fixing and support portion 22 are indirectly fixed to the lifting portion 11.

The control unit 40 configured to control the lifting motor and the motor for movement in width direction, which are not illustrated, is configured to be allowed to drive the lifting motor and the motor for movement in width direction in synchronization with each other, and can lower the ultrasonic welding tool 10 and move the regulating portions 21 that are arranged so as to face each other along the width direction Y at the same time.

Note that the regulating portions 21 can be moved separately and independently along the width direction Y due to control by the control unit 40.

The anvil 30 is a receiving jig having a rectangular parallelepiped shape and provided on a substrate of the conductor joining device 1, and is configured of a movable base portion 31 that is configured so as to be movable along a rail 50, which will be described later, and an anvil upper portion 32 erected on the movable base portion 31.

The anvil upper portion 32 is configured such that a length thereof with respect to the width direction Y is slightly longer than a length of the bundle of wires formed by the plurality of conductor exposed portions 220 that are ultrasonically welded with respect to the width direction, and a height thereof is higher than a height of the regulating portion 21, and anvil main surfaces 321 which are main surfaces of the anvil upper portion 32 are erected on an upper portion of the movable base portion 31 so as to face in the width direction Y.

Anvil-side corrugated portions 33 that are continuously arranged along the longitudinal direction X are formed on the anvil main surface 321. The anvil-side corrugated portion 33 is configured of an anvil-side convex portion 331 that protrudes outward in the width direction Y from the anvil main surface 321, and an anvil-side concave portion 332 that is recessed inside the anvil main surface 321.

The anvil-side convex portion 331 is formed so as to engage with the regulating portion-side concave portion 272, and the anvil-side concave portion 332 is formed so as to engage with the regulating portion-side convex portion 271. In other words, an amplitude of the anvil-side corrugated portions 33 is formed in a sine wave shape in a plan view so as to be equal to amplitude of the corrugated regulating portions 27.

As illustrated in FIG. 7A, the anvil-side corrugated portion 33 in which the anvil-side convex portion 331 and the anvil-side concave portion 332 that are configured in such a manner are continuously arranged is formed in a sine wave shape in a plan view, and four anvil-side corrugated portions 33 are continuously aligned along the longitudinal direction.

Additionally, the anvil-side corrugated portions 33 are provided on both of the anvil main surfaces 321 facing in the width direction Y, but the anvil-side corrugated portions 33 (anvil-side corrugated portions 33R) provided on the +Y side and the anvil-side corrugated portions 33 (anvil-side corrugated portions 33L) provided on the −Y side are deviated by a half wavelength from each other and arranged.

That is, in the anvil-side corrugated portion 33R, the anvil-side concave portion 332 and the anvil-side convex portion 331 are provided in this order from the +X side, and in the anvil-side corrugated portion 33L, the anvil-side convex portion 331 and the anvil-side concave portion 332 are provided in this order from the +X side, and the anvil-side corrugated portion 33R and the anvil-side corrugated portion 33L are formed such that the anvil-side convex portion 331 and the anvil-side concave portion 332 face each other.

Furthermore, the anvil 30 and a regulating portion 21L are arranged such that the anvil-side convex portion 331 and the anvil-side concave portion 332 provided in the anvil-side corrugated portion 33L face the regulating portion-side concave portion 272 and the regulating portion-side convex portion 271 provided on the regulating surface 26L. Similarly, the anvil 30 and a regulating portion 21R are arranged such that the anvil-side convex portion 331 and the anvil-side concave portion 332 provided in the anvil-side corrugated portion 33R face the regulating portion-side concave portion 272 and the regulating portion-side convex portion 271 provided on the regulating surface 26R.

An anvil-side upper surface 322 which is an upper surface of the anvil upper portion 32 is a surface that compresses the conductor exposed portions 220 with the horn-side lower surface 13a in a case where the ultrasonic welding tool 10 is lowered, and an anvil-side concave-convex portion 34 having concaves and concaves and formed along the up-down direction Z is provided.

Further, a flat portion 35 formed in a planar shape having a length of approximately a half wavelength of the sine wave formed by the anvil-side corrugated portion 33 is provided along the longitudinal direction X on each of a tip side and a rear end side of the anvil-side concave-convex portion 34.

Note that, in the present embodiment, three anvils 30 configured so as to be different in a width of the anvil upper portion 32 in the width direction Y are provided (anvils 30a, 30b, and 30c). The widths in the width direction are formed such that the anvil 30a has a smallest width and the anvil 30c has a largest width.

The plurality of anvils 30 (anvils 30a, 30b, and 30c) provided as described above are configured to be movable along the rail 50, so that the desired anvil 30 can be positioned below the ultrasonic welding tool 10.

In addition, while the three anvils 30 are provided in the present embodiment, the number of anvils 30 can be appropriately adjusted so as to be suitable for the insulated wires 200 to be connected, and a width of the anvil upper portion 32 of each of the anvils 30 can also be appropriately adjusted.

As illustrated in FIG. 3 and FIGS. 8A and 8B, the ultrasonic welding tool 10 and the width direction adjustment portion 20 configured as described above can move the regulating portions 21 along the horn-side lower surface 13a by engaging the horn-side concave portions 14 and the horn-side convex portions 15 with the regulating portion-side convex portion 235.

Furthermore, the anvil 30 can be positioned such that the horn-side lower surface 13a and the anvil-side upper surface 322 face each other by being moved along the rail 50 (see FIG. 8B). Thus, the horn-side lower surface 13a, the anvil-side upper surface 322, and the pair of regulating surfaces 26 can form an arrangement space S through which the plurality of conductor exposed portions 220 are inserted (see FIG. 8A).

In such a manner, the conductor joining device 1 in which the width direction adjustment portions 20 are fixed to the ultrasonic welding tool 10 such that the regulating portions 21 can move along the width direction Y, and the anvil 30 is positioned below the horn 13 enables not only the ultrasonic welding tool 10 and the width direction adjustment portions 20 to be moved downward by using the lifting motor, but also the regulating portions 21 to be moved along the width direction Y by using the motor for movement in width direction, by control of the control unit 40 in a state where the conductor exposed portions 220 are inserted through the arrangement space S.

Hereinafter, a method for manufacturing the joined conductor 100 by using the conductor joining device 1 will be described briefly with reference to FIG. 9 to FIGS. 11A and 11B.

Figure 9:
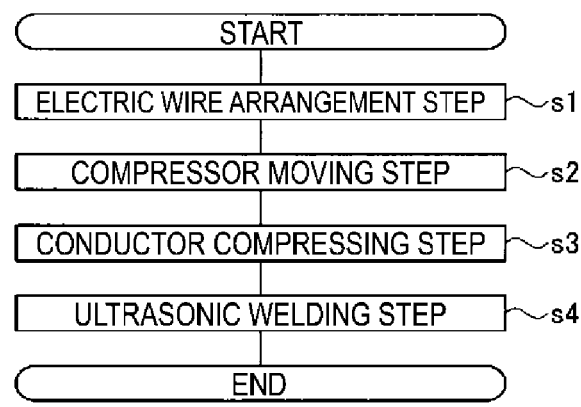
FIG. 9 is a flowchart of a method for connecting conductors.
Figure 10A:
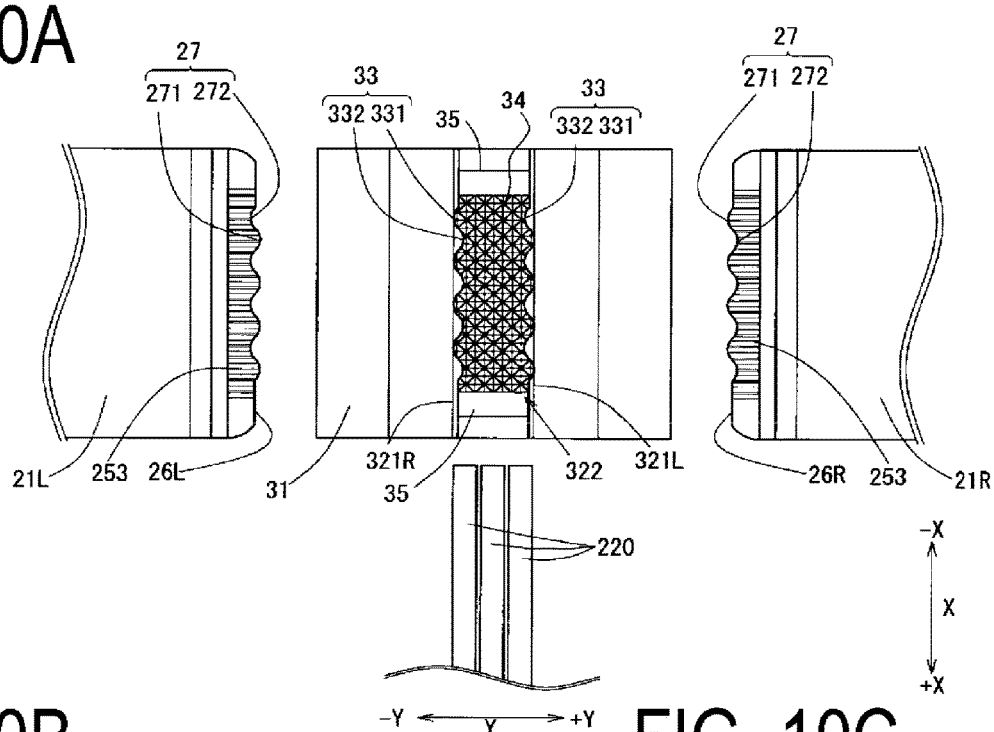
FIGS. 10A to 10C are explanatory diagrams of a conductor joining method.
Figure 10B:
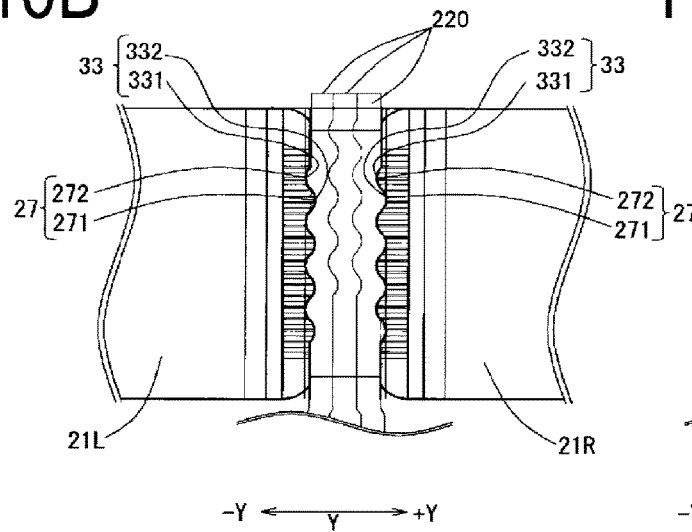
Figure 10C:
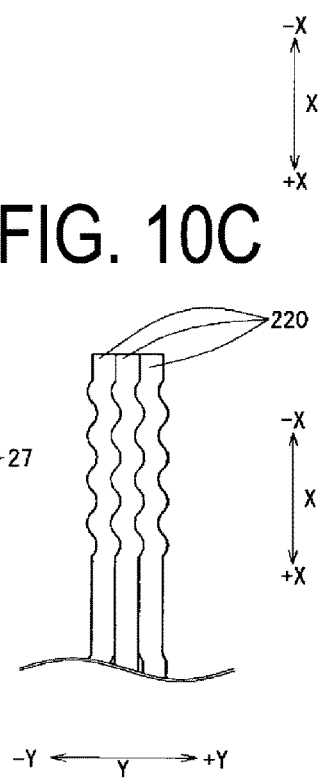
Figure 11A:
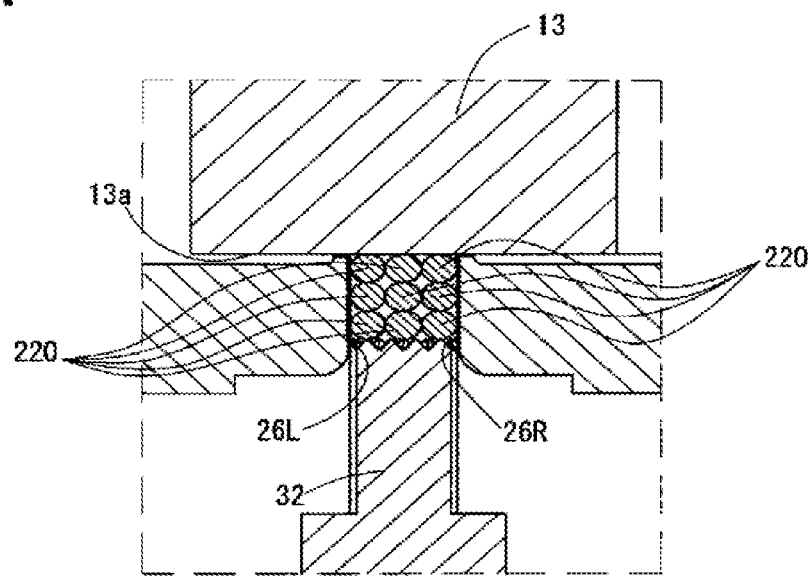
FIGS. 11A and 11B are explanatory diagrams of a conductor joining method.
Figure 11B:
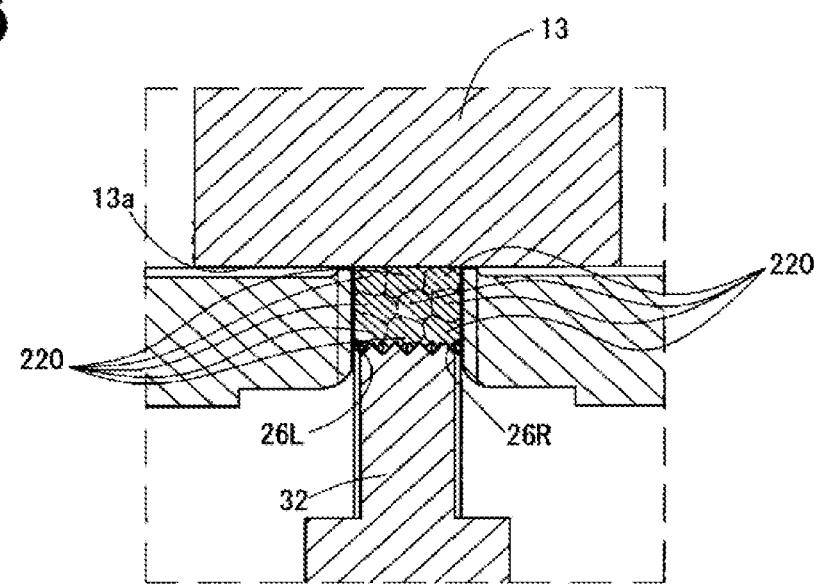

Here, FIG. 9 illustrates a flowchart of a conductor joining method that fuses and joins a plurality (nine in the present embodiment) of conductor exposed portions 220 of the insulated wires 200, FIGS. 10A to 10C illustrate explanatory diagrams for explaining a state where the conductor exposed portions 220 (conductor exposed portions 220) are inserted through the arrangement space S, and the regulating portions 21 are moved along the width direction Y, and FIGS. 11A and 11B illustrate explanatory diagrams for explaining a conductor joining method in which the conductor exposed portions 220 are joined, using a cross-sectional view taken along a D-D line of an a portion in FIGS. 8A and 8B.

Specifically, FIG. 10A illustrates an enlarged plan view of the regulating portions 21 and the anvil 30 before the conductor exposed portions 220 are inserted, FIG. 10B illustrates an enlarged plan view of the regulating portions 21 and the anvil 30 in a state in which the conductor exposed portions 220 are inserted and the regulating portions 21 are moved toward the conductor exposed portions 220, and FIG. 10C illustrates a schematic plan view of the conductor exposed portions 220 compressed in FIG. 10B.

FIG. 11A illustrates a cross-sectional view taken along a D-D line in a state where the conductor exposed portions 220 are inserted into the arrangement space S, and FIG. 11B illustrates a cross-sectional view taken along a D-D line in a state where ultrasonic welding is performed on the conductor exposed portions 220 compressed by lowering the ultrasonic welding tool 10 and the width direction adjustment portions 20 with the conductor exposed portions 220 inserted into the arrangement space S.

Note that in FIGS. 11A and 11B, the horn-side concave portion 14 and the horn-side convex portion 15 are omitted.

As illustrated in FIG. 9, the conductor exposed portions 220 provided at terminal portions of the insulated wires 200 are conductively connected by performing an electric wire arrangement step s1 of arranging the conductor exposed portions 220 in the arrangement space S, a compression and movement step s2 of lowering the ultrasonic welding tool 10 and the width direction adjustment portions 20, a conductor compressing step s3 of compressing the conductor exposed portions 220 by using the horn 13 and the anvil 30, and an ultrasonic welding step s4 of fusing and welding the compressed conductor exposed portions 220 by ultrasonic waves in this order.

Note that the conductor compressing step s3 and the ultrasonic welding step s4 may be performed simultaneously.

Each of the steps will be described in details below with reference to FIGS. 10A to 10C and FIGS. 11A and 11B.

Preliminarily, a plurality (nine in the present embodiment) of the insulated wires 200 are prepared, and the insulating covering 210 on each of the insulated wires 200 on one end side (−X direction side) thereof is cut and peeled off by a predetermined length to expose a stranded conductor surrounded by the insulating covering 210, thereby forming the conductor exposed portions 220.

Next, an anvil 30 suitable for the number and outer diameter of the conductor exposed portions 220 to be connected is selected, and the anvil 30 selected is arranged at a predetermined position by being moved along the rail 50 so as to allow the anvil-side upper surface 322 to be arranged so as to face the horn-side lower surface 13a. Here, the anvil 30a is positioned below the ultrasonic welding tool 10.

Subsequently, the regulating portions 21 are moved along the width direction Y until the regulating surfaces 26 have a predetermined interval, and the ultrasonic welding tool 10 is risen until the horn 13 reaches a predetermined height to form the arrangement space S.

In this state, as illustrated in FIG. 10A, the conductor exposed portions 220 are arrayed in the arrangement space S formed by the regulating portions 21 arranged so as to face each other at a predetermined interval and the horn 13, and are inserted from the +X direction side toward the −X direction side (the electric wire arrangement step s1). Note that, in the present embodiment, by arranging three conductor exposed portions 220 along the up-down direction Z and arranging three conductor exposed portions 220 along the width direction Y, nine conductor exposed portions in total are inserted into the arrangement space S and joined together.

Then, while the ultrasonic welding tool 10 is lowered, the regulating portions 21 are moved toward a conductor exposed portions 220 side along the width direction Y in synchronization with lowering of the ultrasonic welding tool 10, by control of the control unit 40. Accordingly, as illustrated in FIG. 10B and FIG. 11A, the regulating surfaces 26 are brought into contact with both respective side surfaces of the anvil upper portion 32 on a width direction Y side, the conductor exposed portions 220 are sandwiched between the horn-side lower surface 13a and the anvil-side upper surface 322, and the conductor exposed portions 220 are pressed from the above by the horn 13 (the compression and movement step s2).

Specifically, in this compression and movement step s2, the ultrasonic welding tool 10 is lowered in a state in which the conductor exposed portions 220 are arranged in the arrangement space S formed among the horn-side lower surface 13a, the anvil-side upper surface 322, and the pair of regulating surfaces 26, and the regulating portions 21 are moved toward the conductor exposed portions 220 side along the horn-side lower surface 13a, thereby causing the corrugated regulating portions 27 provided on the regulating surfaces 26 and the anvil-side corrugated portions 33 provided on the anvil main surfaces 321 to engage with each other.

Here, since a width of the anvil main surfaces 321 with respect to the width direction Y is configured so as to be slightly longer than a width formed by a bundle of the wires of the conductor exposed portions 220, the conductor exposed portions 220 can also be prevented from being caught between the regulating portions 21 and the anvil upper portion 32 in a state where the corrugated regulating portions 27 and the anvil-side corrugated portions 33 engage with each other.

Further, in the state where the conductor exposed portions 220 are arranged in the arrangement space S, even when the conductor exposed portions 220 are pushed from the above and moved in the width direction Y by further lowering the ultrasonic welding tool 10, the movement in the width direction Y of the conductor exposed portions 220 can be regulated by the regulating surfaces 26.

Subsequently, by lowering the ultrasonic welding tool 10 further downward (conductor compressing step s3), the conductor exposed portions 220 are pressurized and deformed by the horn 13 and expands in the width direction Y, but the corrugated regulating portions 27 engage with the anvil upper portion 32, thereby causing the conductor exposed portions 220 to be brought into contact with the regulating surfaces 26.

Additionally, by further pressurizing the conductor exposed portions 220 by the horn 13, as illustrated in FIG. 10B, the conductor exposed portions 220 are pressed against the corrugated regulating portions 27 provided on the regulating surfaces 26, and continuous corrugated shapes are formed along the longitudinal direction X at positions corresponding to side surfaces of the insulated wires 200.

In this manner, by further lowering the horn 13 in a state where the insulated wires 200 are arranged in the arrangement space S, the conductor exposed portions 220 can be compressed from the up-down direction Z (conductor compressing step s3), and the conductor exposed portions 220 arranged in the up-down direction Z can be more reliably in contact with each other. Additionally, the conductor exposed portions 220 are formed in corrugated shapes along the longitudinal direction X because the conductor exposed portions 220 are compressed in contact with the regulating surfaces 26. As a result, the conductor exposed portions 220 arranged in parallel along the width direction Y can be brought into contact with each other in a direction intersecting the longitudinal direction X (the width direction Y), and the conductor exposed portions 220 can be reliably brought into contact with each other by the compression.

Ensuring reliable electrical conductivity by reliably being in contact with and joining the conductor exposed portions 220 with each other in this manner is an important issue in manufacturing the joined conductor 100. In addition, for example, according to request for reduction in weight of vehicles in recent years, there has also been a need to join alloyed electric wires having high strength. These materials having high strength are difficult to deform, and it is difficult to make the conductor exposed portions 220 be brought into contact with each other more reliably.

In order to reliably bring the conductor exposed portions 220 into contact with each other and joining them in this manner, for example, as manufacturing steps in the present embodiment, the conductor compressing step s3 may be performed while temperature of the materials is increased and the strength is reduced by performing ultrasonic oscillation that is weaker than that in the welding of the ultrasonic welding step s4 to be described below in the conductor compressing step s3. The same object is also achieved, for example, by performing ultrasonic oscillation that is weaker than that in the welding immediately before the ultrasonic welding step s4, after the conductor compressing step s3 is completed.

When a thickness in a case where an inside of a mold is filled 100% with conductors, which is calculated by dividing a total cross-sectional area of the conductors of the conductor exposed portions 220 by a surface width of the anvil, is defined as a 100% height, it is desirable to compress the conductor exposed portions 220 up to a height lower than the 100% height when the conductor compressing step s3 is performed.

As a result, elongation in the longitudinal direction X occurs in the conductor exposed portions 220 filled in the mold, an oxide film formed on the conductor exposed portions 220 is broken, and the oxide film is efficiently removed in subsequent welding. In a case of the height less than or equal to 100%, the above described object is achieved, but a height less than or equal to 95% and equal to or more than 70% is preferable. More preferably, the compression is performed between 90% and 80%. When the compression is small, the above described object is not easily achieved, and when the compression is too large, the cross-sectional area becomes smaller in a root portion of the electric wires and the strength becomes weak, which is not preferable.

In this state, by ultrasonically oscillating the horn 13 along the longitudinal direction X intersecting the width direction Y, the conductor exposed portions 220 are ultrasonically metal-joined to each other by ultrasonic welding (the ultrasonic welding step s4). In the ultrasonic welding step s4, control may be performed by the control unit 40 to determine a bottom dead center (stopping point) in the up-down direction Z during welding. As a result, sudden increase in temperature during welding of the conductor exposed portions 220 is suppressed, and sticking to the horn 13 is suppressed.

The ultrasonic oscillation may also be continued after reaching the bottom dead center during welding. As a result, the welded portion is maintained at high temperature while the oxide film is removed and atoms of the top surface of the conductor exposed portions 220 remain in contact with one another. As a result, the electrical conductivity and the rigidity are further improved. Note that it is desirable that a height of the bottom dead center be smaller than the height formed in the conductor compressing step s3, and it is desirable that the height of the bottom dead center be smaller than the 100% height which means that the inside of the mold is filled 100% with the conductors and which is calculated by the total cross-sectional area of the conductor exposed portions 220 and the surface width of the anvil. When the height of the bottom dead center is less than or equal to 100%, the above described object is achieved, but the height less than or equal to 90% and equal to or more than 70% is preferable. More preferably, the height is between 85% and 80%. When the compression is small, the above described object is not easily achieved, and when the compression is too large, the cross-sectional area becomes small in the root portion of the electric wires, and it becomes weak, which is not preferable.

Note that, as described in the present embodiment, even in a case where the corrugated regulating portion 27 is not formed on the regulating surface 26 of the regulating portion 21, that is, even in a case where the corrugated portion 140 having the corrugated shape is not formed on the side surface of the joining portion 110 in the joined conductor 100 to be manufactured, the conductor exposed portions can be reliably brought into contact with each other and be joined, and the electrical conductivity of the joined conductor can be reliably ensured.

As a result, nine conductor exposed portions 220 that are pressurized so as to form the corrugated shape along the longitudinal direction X inside the arrangement space S are ultrasonically welded with the conductor exposed portions 220 adjacent to each other along the longitudinal direction X and the width direction Y reliably brought into contact with each other, so that the joined conductor 100 with the improved electrical conductivity and rigidity can be manufactured (see FIG. 11B).

Thus, the joined conductor 100 includes the joining portion 110 in which the plurality of conductor exposed portions 220 arranged along the longitudinal direction X are fused and joined, the joining portion 110 is along the longitudinal direction X, and is provided with the first surface 121 and the second surface 122 being two surfaces that face each other, and in a case where a direction in which the first surface 121 and the second surface 122 being two surfaces that face each other is referred to as the width direction Y, and the corrugated portions 140 in which the ridges 141 protruding outward in the width direction Y and the valleys 142 recessed inward in the facing direction are continuously provided along the longitudinal direction X on both the first surface 121 and the second surface 122 that face each other are provided, so that the joining strength between the conductor exposed portions 220 can be improved and the electrical conductivity can be improved.

Specifically, since the corrugated portion 140 is formed on at least the first surface 121 of the first surface 121 and the second surface 122 which are facing surfaces, the conductor exposed portions 220 aligned and arranged in the width direction Y among the plurality of conductor exposed portions 220 configuring the joining portion 110 are joined in a state where the conductor exposed portion 220 is in contact with other conductor exposed portions 220 adjacent thereto in the width direction Y along a direction intersecting the longitudinal direction X (see FIG. 10C) Thus, the joining strength between the conductor exposed portions 220 arranged in the width direction Y is improved in the joining portion 110.

Thus, the integrity of the joining portion 110 can be improved, the electrical conductivity of the conductor exposed portions 220 configuring the joined conductor 100 can be improved, and the rigidity of the joined conductor 100 can also be improved.

In addition, the corrugated portions 140 are provided on both the first surface 121 and the second surface 122 that faces the first surface 121, when the corrugated portion 140 formed on the first surface 121 is referred to as the corrugated portion 140L, and the corrugated portion 140 formed on the second surface 122 is referred to as the corrugated portion 140R, the corrugated portion 140L and the corrugated portion 140R are configured with the same corrugated shape, and the ridge 141 in the corrugated portion 140L faces the valley 142 of the corrugated portion 140R, and the valley 142 in the corrugated portion 140L faces the ridge 141 of the corrugated portion 140R, in other words, the corrugated portion 140L formed on the first surface 121 and the corrugated portion 140R formed on the second surface 122 are configured so as to deviated by a half wavelength along the longitudinal direction, so that the conductor exposed portions 220 aligned and arranged along the width direction Y oscillate at a constant width in the width direction Y. As a result, the apparent cross-sectional coefficient of the entire joining portion 110 can be improved, and the rigidity of the joined conductor 100 can be improved.

In addition, since widths of the first surface 121 and the second surface 122 with respect to the width direction Y are constant in the longitudinal direction X, that is, since cross-sectional areas of the conductor exposed portions 220 in the longitudinal direction X are constant, unevenness in rigidity of the joining portion 110 can be suppressed, and variations in quality of the joined conductor 100 can be suppressed.

Furthermore, by providing a plurality of the corrugated portions 140 along the longitudinal direction X, in the joining portion 110 where the conductor exposed portions 220 periodically aligned and arranged in the intersecting direction that intersects the longitudinal direction X are joined (see FIG. 10C), the joining strength between the conductor exposed portions 220 aligned and arranged in the intersecting direction can be improved, and a contact area between the conductor exposed portions 220 can be increased. Accordingly, the integrity of the joining portion 110 can be further improved, and the electrical conductivity and the rigidity of the conductor exposed portions 220 can be further improved.

Additionally, the height L1 in an orthogonal cross-sectional direction from the bottom of the valley 142 to the vertex of the ridge 141 is configured to be less than or equal to 0.5 times the interval L2 in the width direction Y between the first surface 121 and the second surface 122, so that the electrical conductivity of the joined conductor 100 can be improved and the rigidity can be reliably improved.

Specifically, when the height of the ridge 141 with respect to the valley 142 is higher than 0.5 times the interval between the first surface 121 and the second surface 122 in the width direction Y, the amplitude of the corrugated shape in the joining portion 110 increases, and a load applied to the conductor exposed portions 220 increases, so that the conductor exposed portions 220 may be partially ruptured or damaged, the electrical conductivity of the joined conductor 100 may not be sufficiently ensured, and the rigidity may decline.

However, by configuring the height L1 of the ridge 141 with respect to the valley 142 in the width direction Y so as to be less than or equal to 0.5 times the interval L2 in the width direction Y between the first surface 121 and the second surface 122, the load of the conductor exposed portions 220 configuring the joining portion 110 can be reduced, and the conductor exposed portions 220 aligned in the width direction Y can be oscillated in the width direction Y, so that the joining strength between the conductor exposed portions 220 due to curvature can be reliably improved, and the contact area between the conductor exposed portions 220 can be increased.

As a result, the integrity of the joining portion 110 can be improved, and a possibility that the conductor exposed portions 220 are partially ruptured or damaged can be reduced, and the electrical conductivity of the joined conductor 100 can be sufficiently improved, and the rigidity can be reliably improved.

Furthermore, the height L1 in the orthogonal cross-sectional direction from the bottom of the valley 142 to the vertex of the ridge 141 is configured to be equal to or more than 0.5 times the diameter L3 that is the minimum diameter of the plurality of conductor exposed portions 220 that are arranged, so that the electrical conductivity of the joined conductor 100 can be improved.

Specifically, when the height L1 of the ridge 141 with respect to the valley 142 in the width direction Y is lower than 0.5 times the minimum diameter of the plurality of conductor exposed portions 220 that are arranged, since an amplitude amount of a corrugated shape formed by the ridge 141 and the valley 142 in the joining portion 110 is small, and the conductor exposed portions 220 arranged along the width direction Y are not arranged so as to intersect with each other with respect to the longitudinal direction X, the integrity of the joining portion 110 cannot be sufficiently improved, and the electrical conductivity of the joined conductor 100 cannot be sufficiently improved.

In contrast, by making the height of the ridge 141 with respect to the valley 142 in the width direction Y be equal to or more than 0.5 times the minimum diameter of the plurality of conductor exposed portions 220 that are arranged, the joining portion 110 can be reliably bent along the ridge 141 and the valley 142, so that the conductor exposed portions 220 arranged along the width direction Y are arranged so as to intersect with each other in the longitudinal direction X. As a result, the joining strength between the conductor exposed portions 220 can be reliably improved, the contact area between the conductor exposed portions 220 can be increased, and the electrical conductivity of the joined conductor 100 can be improved.

Further, the joining portion 110 may have the planar portion 150 formed in a planar shape along the longitudinal direction X between the tip thereof and the corrugated portion 140. Accordingly, it is possible to suppress peel-off of the joining between the conductor exposed portions 220 from a tip side of the joining portion 110.

Specifically, since the ridge 141 and the valley 142 that configure the corrugated portion 140 are configured by bending the conductor exposed portions 220, the joining between the conductor exposed portions 220 is easily peeled off, when an external force acts on an opposite side to a bending direction.

However, since the joining portion 110 has the planar surface 150 between the tip and the corrugated portion 140, it is possible to prevent an unintended external force on the opposite side to the bending direction from directly acting on the ridge 141 and the valley 142, and even when an unintended external force is applied, it is possible to suppress the peel-off of the joining between the conductor exposed portions 220 because the external force can be absorbed by the planar portion 150.

In addition, since the joining portion 110 is configured with the joining portion 110 formed by ultrasonic welding, an interface between the conductor exposed portions 220 in the joining portion 110 can be joined by ultrasonic welding, so sufficient joining can be performed even inside the joined conductor 100. As a result, the joining strength of the joined conductor 100 can be stabilized. Furthermore, change in physical properties caused by excessive heat is suppressed and, therefore, mixing of foreign objects can be prevented. Accordingly, the electrical conductivity and the rigidity of the joined conductor 100 can be stabilized.

Further, in the cross section of the joining portion 110, the conductor exposed portions 220 are deformed and the interfaces between the conductor exposed portions 220 are closely in contact with and are joined by the ultrasonic joining portion 160, and thus, specifically, as illustrated in FIGS. 2B and 2C, since the conductor exposed portions 220 are deformed from a perfect circular shape to an elliptical shape, for example, in an orthogonal cross section orthogonal to the longitudinal direction X, the contact area between the conductor exposed portions 220 is increased, and the joining strength between the conductor exposed portions 220 is increased, so that the integrity of the joining portion 110 can be further improved, and the electrical conductivity and the rigidity of the joined conductor 100 can be further improved.

Furthermore, the conductor exposed portions 220 are formed of aluminum or aluminum alloy, which makes it possible to reduce the weight of the joined conductor 100.

Further, the conductor joining device 1 for joining the plurality of conductor exposed portions 220 by ultrasonic welding includes the ultrasonic welding tool 10 having the horn-side lower surface 13a that is brought into contact with the conductor exposed portions 220, and configured to ultrasonically oscillate, the pair of regulating portions 21 configured to be brought into contact with the horn-side lower surface 13a and configured to be relatively movable along the horn-side lower surface 13a, and the anvil 30 configured to relatively move in the up-down direction Z of approaching to or separating from the horn-side lower surface 13a, the corrugated regulating portion 27 having the corrugated potion in which, on each of the regulating surfaces 26 facing each other in the pair of the regulating portions 21, the regulating portion-side convex portion 271 protruding toward the facing other regulating surface 26 and the regulating portion-side concave portion 272 recessed in a direction opposite to the protruding direction of the regulating portion-side convex portion 271 are continuously provided along the width direction Y in which the pair of regulating surfaces 26 face each other and the longitudinal direction X orthogonal to the up-down direction Z is formed, and the anvil 30 includes the anvil-side convex portion 331 and the anvil-side concave portion 332 that engage with the regulating portion-side convex portion 271 and the regulating portion-side concave portion 272, and the ultrasonic welding tool 10 and the regulating portions 21 relatively move with respect to the anvil 30 in such a manner that the anvil 30 is sandwiched between the regulating portions 21 facing each other and at least one of the pair of regulating portions 21 relatively moves toward the other regulating portion 21, which allows the joining strength between the conductor exposed portions 220 to be improved.

Specifically, the horn 13 relatively moves with respect to the anvil 30 by forming the corrugated regulating portions 27 having the corrugated shape on the regulating surfaces 26, and providing the anvil-side convex portions 331 and the anvil-side concave portions 332 formed on the anvil 30 so as to be able to engage with the corrugated regulating portion 27, so that the plurality of arranged conductive exposed portions 220 are compressed by the anvil 30 and the horn 13.

In addition, since the regulating portions 21 move inward in the width direction Y according to the relative movement of the horn 13, the regulating portions 21 can regulate movement of the conductors outward in the width direction Y, and can bend the conductor exposed portions 220 into the corrugated shape that oscillates with respect to the width direction Y toward the longitudinal direction X.

By bending the conductor exposed portions 220 into the corrugated shape that oscillates with respect to the width direction Y in this manner, the conductor exposed portions 220 aligned and arranged along the width direction Y can be brought into contact with each other along a direction intersecting the longitudinal direction X, and the conductor exposed portions 220 can be reliably brought into contact with each other. Thus, by joining the conductor exposed portions 220 together by ultrasonic welding, the joining strength between the conductor exposed portions 220 arranged along the width direction Y can also be increased, and the integrity of the joined conductor 100 can be improved.

Thus, the electrical conductivity and the joining strength of the joined conductor 100 can be improved. In addition, since the joining strength between the conductor exposed portions 220 is improved, the rigidity of the manufactured joined conductor 100 as a whole can also be improved.

Additionally, since the corrugated regulating portion 27 is formed in a sine wave shape, the end portions in the width direction Y of the arrangement space S formed by the horn 13, the regulating portions 21, and the anvil 30 are formed in a circular arc shape, so it is possible to form the corrugated shape in which the conductor exposed portions 220 are bent in the circular arc shape along the longitudinal direction X. As a result, the conductor exposed portions 220 arranged in the width direction Y can be continuously brought into contact with each other, and the conductor exposed portions 220 can be reliably brought into contact with each other, and the joining strength can be increased. In addition, it is possible to prevent a corner portion in which the joining becomes weak from being formed in the joined conductor 100 during compression and ultrasonic welding.

Furthermore, since the conductor exposed portions 220 can be formed in a smooth corrugated shape along the longitudinal direction X by the corrugated regulating portion 27, as in a case where the anvil-side convex portion 331 is formed in a rectangular shape, it is possible to prevent a corner of the anvil-side convex portion 331 from abutting on the conductor exposed portions 220 and cutting the conductor exposed portions 220, and it is possible to reliably improve the electrical conductivity and the rigidity of the joined conductor 100.

Furthermore, the plurality of regulating portions 27 are provided along the longitudinal direction X, so that the conductor exposed portions 220 can be bent into the corrugated shape that periodically repeatedly oscillates with respect to the width direction Y toward one side in the longitudinal direction X, the conductor exposed portions 220 aligned and arranged in the width direction Y can be periodically brought into contact with each other in a direction that intersects the longitudinal direction X, and the conductor exposed portions 220 can be more reliably brought into contact with each other.

As a result, the joining strength can be further improved by ultrasonically joining the conductor exposed portions 220. Therefore, the integrity of the joining part of the conductor exposed portions 220 can be further improved, and the electrical conductivity of the joined conductor 100 can be further improved.

In addition, the corrugated regulating portions 27 are formed on both regulating surfaces 26 (regulating surfaces 26R, and 26L) that face each other in the pair of regulating portions 21, and the corrugated regulating portion 27 formed on the regulating surface 26L is referred to as the corrugated regulating portion 27L, the corrugated regulating portion 27 formed on the regulating surface 26R is referred to as the corrugated regulating portion 27R, the corrugated regulating portion 27L and the corrugated regulating portion 27R are configured to have the same corrugated shape, and the regulating portion-side convex portion 271 of the corrugated regulating portion 27L faces the regulating portion-side concave portion 272 of the corrugated regulating portion 27R, and the regulating portion-side concave portion 272 of the corrugated regulating portion 27L faces the regulating portion-side convex portion 271 of the corrugated regulating portion 27R, that is, the corrugated regulating portion 27L formed in the corrugated regulating portion 27L and the corrugated regulating portion 27R formed in the regulating surface 26R are configured to be deviated by a half wavelength, so that the joined conductor 100 bent by the corrugated regulating portion 27L and the corrugated regulating portion 27R is formed in the corrugated shape that oscillates in the width direction Y with a predetermined width with respect to the width direction Y toward one side in the longitudinal direction X. As a result, the apparent cross-sectional coefficient of the joined conductor 100 ultrasonically welded can be improved, and the rigidity of the joined conductor 100 can be improved.

In addition, since the length (length L2) of the width between the side surfaces (first surface 121 and second surface 122) along the width direction Y in the joined conductor 100 becomes a predetermined value, it is possible to suppress imbalance in contact area and joining strength between the conductor exposed portions 220 in the longitudinal direction X. Thus, the electrical conductivity and the joining strength of the joined conductor 100 can be stabilized.

In addition, by providing the flat portion 28 formed so as to be flat along the longitudinal direction X on the tip side in the longitudinal direction X of the regulating surface 26 in the regulating portion 21, the tip side of the joined conductor 100 can be formed in a planar shape, and it is possible to suppress the peel-off of the joining between the conductor exposed portions 220 from the tip side.

Specifically, in the bending part bent into the corrugated shape in the joined conductor 100, the joining between the conductor exposed portions 220 is easily peeled off in a case where unintended external force acts on the opposite side to the bending direction. In addition, when the tip side of the joined conductor 100 is formed in the corrugated shape, the unintended external force on the opposite side to the bending direction may act on the tip portion with the corrugated shape.

In contrast, by providing the flat portion 28 on the tip side in the longitudinal direction X of the regulating surface 26, the tip side of the joined conductor 100 can be formed in a planar shape, and it is possible to prevent the unintended external force on the opposite side to the bending direction from acting directly on the bending part bent in the corrugated shape in the joined conductor 100. In addition, even when the unintended external force acts on the tip part of the joined conductor 100, the tip part formed on the planar surface can absorb the external force, so it is possible to suppress the peel-off of the joining between the conductor exposed portions 220.

Additionally, the ultrasonic welding tool 10 can effectively join the conductor exposed portions 220 when the ultrasonic welding tool 10 ultrasonically oscillates along a direction (the longitudinal direction X) intersecting a direction (the up-down direction Z) in which the ultrasonic welding tool 10 and the anvil 30 face each other.

Specifically, by compressing the conductor exposed portions 220 arranged in the arrangement space S by the ultrasonic welding tool 10 and the anvil 30, external force along the up-down direction Z (a compressing direction) acts on the horn-side lower surface 13a of the conductor exposed portions 220 aligned in the up-down direction Z.

In addition, when the ultrasonic welding tool 10 and the anvil 30 compress the conductor exposed portions 220 to cause the conductor exposed portions 220 to tend to extend in the width direction Y, movement of the conductor exposed portions 220 in the width direction Y is regulated by the corrugated regulating portions 27, and the conductor exposed portions 220 are arranged so as to be bent in the width direction Y toward the longitudinal direction X. As a result, the conductor exposed portions 220 aligned in the width direction Y are more reliably brought into contact with each other, and the horn-side lower surface 13a is formed along a direction intersecting the longitudinal direction X.

In this state, when the ultrasonic welding tool 10 is ultrasonically oscillated in the longitudinal direction, in the conductor exposed portions 220 in which the external force acts on the conductor exposed portions 220 arranged in the up-down direction Z, an oxide film or the like on a metal surface of each of the conductor exposed portions 220 on which the external force acts is reliably removed by ultrasonic oscillation, and then the conductor exposed portions 220 are easily welded due to interatomic forces of attraction of metal configuring each of the conductor exposed portions 220.

Furthermore, the conductor exposed portions 220 aligned in the width direction Y are also bent, so that the horn-side lower surface 13a is formed along a direction intersecting the longitudinal direction X, and therefore, an oxide film or the like on the metal surface of each of the conductor exposing portions 220 is reliably removed, and the conductor exposed portions 220 are easily welded due to interatomic forces of attraction of the metal configuring each of the conductor exposed portions 220. Accordingly, the conductor exposed portions 220 aligned in the up-down direction Z or the width direction Y can be efficiently and reliably joined.

Note that, in the present embodiment, the horn 13 is configured to ultrasonically oscillate along the longitudinal direction X, but instead of the longitudinal direction X, may also be configured to ultrasonically oscillate in a direction intersecting the width direction Y or the longitudinal direction X.

In addition, in the present embodiment, the anvil main surface 321 is configured to face the width direction Y and the regulating portions 21 are configured to move along the width direction Y, but this configuration is not necessarily required, and for example, the anvil main surface 321 may be configured to face the longitudinal direction X orthogonal to the width direction Y and the regulating portions 21 may be configured to move along the longitudinal direction X orthogonal to the width direction Y. Furthermore, the anvil main surface 321 may be configured to face in a direction intersecting the width direction Y, and the regulating portions 21 may be configured to move along a direction in which the anvil main surface 321 faces. That is, a direction of ultrasonic oscillation of the horn 13 and the longitudinal direction of the insulated wires 200 may coincide with each other or may intersect with each other.

In addition, by allowing the control unit 40 that synchronizes relative movement of the ultrasonic welding tool 10 and the regulating portions 21 with respect to the anvil 30 and movement of at least one of the pair of regulating portions 21 with respect to the other to be provided, that is, by allowing movement of the ultrasonic welding tool 100 and the regulating portions 21 in a compressing direction and movement of the regulating portions 21 in the width direction Y to be synchronized with each other, the anvil 30 and the pair of regulating portions 21 can be brought into contact with each other before the anvil 30 and the ultrasonic welding tool 10 compress the conductor exposed portions 220, and thus, the conductor exposed portions 220 can be reliably prevented from being caught in a gap formed between the anvil 30 and the regulating portions 21.

As for correspondence between the configuration of the invention and the above-described embodiment,
the conductor corresponds to the conductor exposed portion 220,
the convex line portion corresponds to the ridge 141,
the concave line portion corresponds to the valley 142,
the joining portion corresponds to the joining portion 110,
the joined conductor corresponds to the joined conductor 100,
the first corrugated portion corresponds to the corrugated portion 140L,
the second corrugated portion corresponds to the corrugated portion 140R,
the facing direction corresponds to the width direction Y,
the ultrasonic joining portion corresponds to the joining portion 110,
the ultrasonic welding portion corresponds to the ultrasonic joining portion 160,
the first direction corresponds to the up-down direction Z,
the second direction corresponds to the width direction Y,
the contact surface corresponds to the horn-side lower surface 13a,
the facing direction corresponds to the width direction Y,
the orthogonal direction corresponds to the longitudinal direction X,
the convex portion corresponds to the regulating portion-side convex portion 271,
the concave portion corresponds to the regulating portion-side concave portion 272,
the engaging convex portion corresponds to the anvil-side convex portion 331
the engaging concave portion corresponds to the anvil-side concave portion 332,
the first corrugated regulating portion corresponds to the corrugated regulating portion 27R,
the second corrugated regulating portion corresponds to the corrugated regulating portion 27L,
the facing contact surface corresponds to the anvil-side upper surface 322,
the step of arranging conductors corresponds to the electric wire arrangement step s1 and,
the step of moving and compressing corresponds to the compression and movement step s2,
but the invention is not limited to the configuration of the embodiment described above, and many embodiments can be obtained.

For example, in the present embodiment, the conductor exposed portion 220 is a stranded conductor formed by twisting wires with electrical conductivity together, but is not limited to this embodiment, and may be, for example, configured of a solid wire or wires bundled together. Furthermore, the conductor exposed portion 220 is not limited to an aluminum-based conductor made of aluminum, aluminum alloy, or the like, and may be made of, for example, copper or copper alloy. That is, any material may be used as long as it has electrical conductivity.

Further, the conductor exposed portion 220 is exposed by cutting and peeling off the insulating covering 210 forming the outer layer at one end of the insulated wire 200 covered with the insulating covering 210 having insulating properties, but may be a conductor covered with no insulating covering 210, or a conductor in which wires are only bundled.

Furthermore, the conductor exposed portions 220 are the same conductor, but a plurality of conductors having different types may be used. In other words, a configuration in which the joining portion is surrounded by copper tube, copper foil, or the like, for example, may be used for the plurality of conductor exposed portions 220 described above.

In addition, not only a case where the corrugated portion 140 is formed on each of the first surface 121 and the second surface 122 but also a case where the corrugated portion 140 is formed on only one of the first surface 121 and the second surface 122 may be applicable. In addition, the corrugated portion 140 may be formed on an entire surface of the first surface 121 or the second surface 122, or may be formed on a part of the first surface 121 or the second surface 122.

Furthermore, in the corrugated portion 140, it is sufficient that at least one or more of the ridges 141 and at least one or more of the valleys 142 may be continuous along the longitudinal direction X, and for example, as long as at least one of the ridges 141 and at least one of the valleys 142 are continuous, the number of the ridges 141 and the number of the valleys 142 do not need to be coincident.

Figure 12:
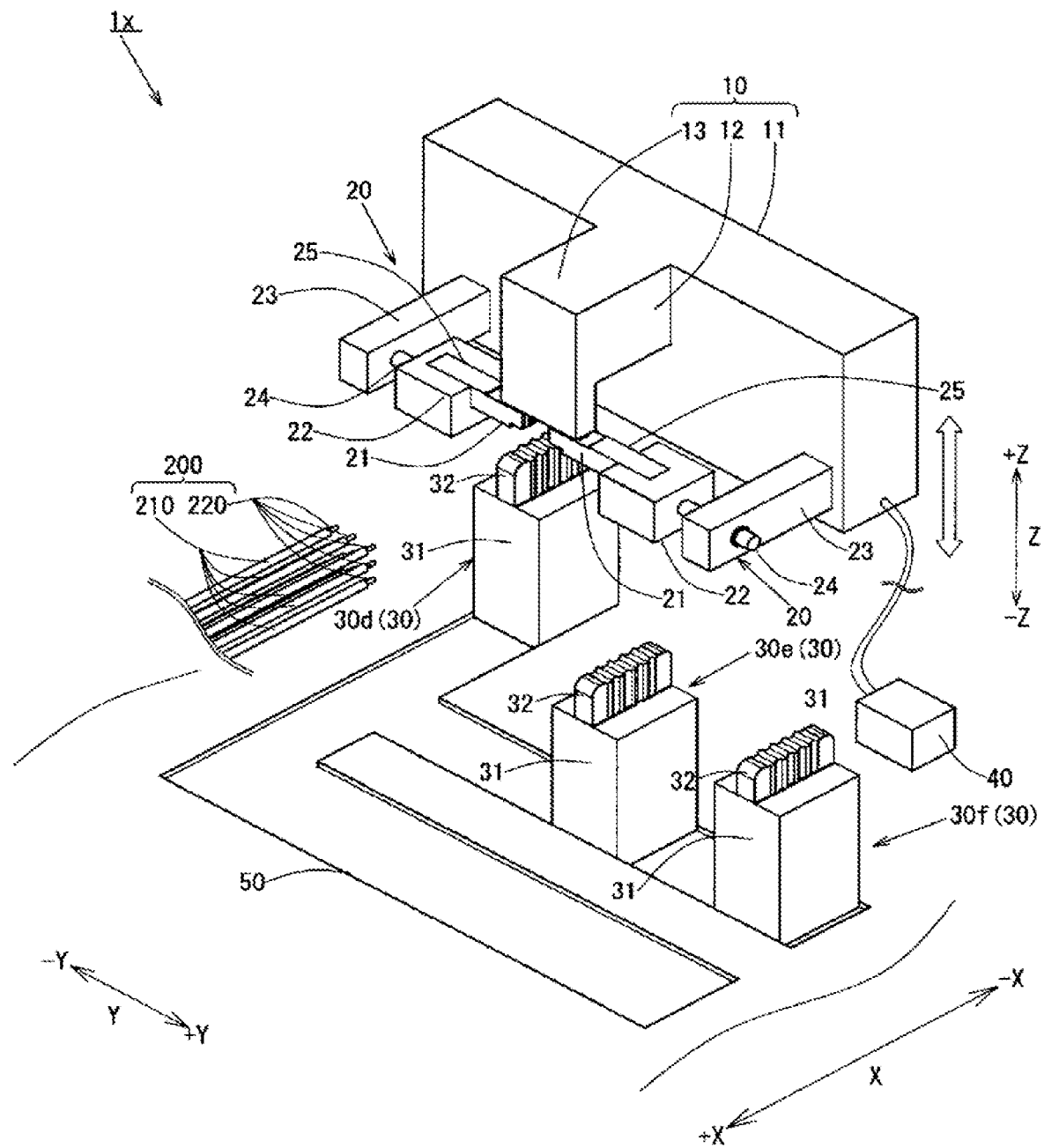
FIG. 12 is a schematic perspective view of a conductor joining device according to another embodiment.
Figure 13:
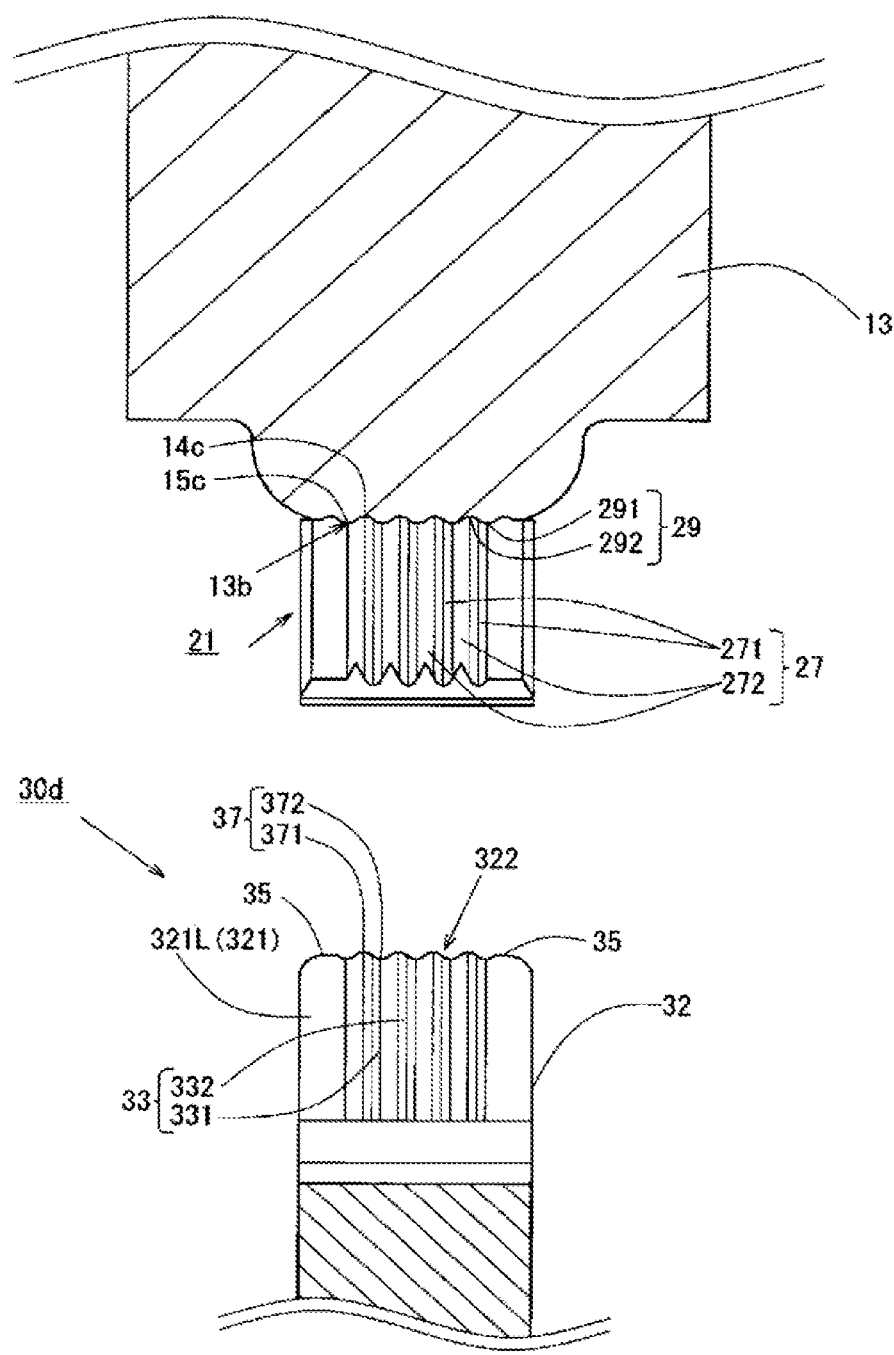
FIG. 13 is a cross-sectional view of the conductor joining device according to still another embodiment.

In addition, in the present embodiment, among the horn-side lower surface 13a, the anvil-side upper surface 322, and the pair of regulating surfaces 26 that form the arrangement space S for inserting the conductor exposed portions 220, although the corrugated regulating portions 27 are provided only on the regulating surfaces 26, as illustrated in FIG. 12 and FIG. 13, for example, the bottom surface portion of the horn 13 (referred to as a corrugated bottom surface portion 13b) and the anvil-side upper surface 322 may be formed in a corrugated shape.

Hereinafter, a conductor joining device 1x in which the corrugated bottom surface portion 13b and the anvil-side upper surface 322 are formed in a corrugated shape will be briefly described based on FIG. 12 and FIG. 13.

Here, FIG. 12 is a schematic perspective view of the conductor joining device 1x, and the horn 13 is illustrated by enlarging the corrugated bottom surface portion 13b and the anvil-side upper surface 322 of the cross-sectional illustration corresponding to the cross-sectional view taken along a C-C line in FIG. 8A of the conductor joining device 1x.

As illustrated in FIG. 12 and FIG. 13, a compression-side corrugated portion 37 is provided on the anvil-side upper surface 322 in place of the anvil-side concave-convex portion 34.

Note that the anvils 30 each of which the compression-side corrugated portion 37 is configured are referred to as an anvil 30d, an anvil 30e, and an anvil 30f (see FIG. 12).

The compression-side corrugated portion 37 corresponds to the intersecting-side corrugated portion, and is configured of a compression-side convex portion 371 protruding upward compared to the flat portion 35, and a compression-side concave portion 372 recessed downward, and four compression-side corrugated portions 37 are continuously aligned and arranged along the longitudinal direction X. That is, the compression-side convex portion 371 corresponds to the intersecting-side convex line portion, and the compression-side concave portion 372 corresponds to the intersecting-side concave line portion, and are arranged continuously along the longitudinal direction X, respectively.

On the other hand, as illustrated in FIG. 13, the corrugated bottom surface portion 13b protruding downward is provided on the bottom surface side of the horn 13, and the corrugated bottom surface portion 13b is provided with the horn valley in width direction 14c that forms a valley recessed downward in a circular arc shape and a horn ridge in width direction 15c protruding downward in a circular arc shape.

In addition, a corrugated portion for movement 29 is formed in place of the movement assist portion for regulation 25 in the regulating portion 21 that is formed so as to be movable in the width direction Y along the corrugated bottom surface portion 13b. The corrugated portion for movement 29 is configured of a convex portion for movement assist 291 that can loosely engage with the horn valley in width direction 14c, and a concave portion for movement assist 292 that can loosely engage with the horn ridge in width direction 15c. Note that the convex portion for movement assist 291 and the concave portion for movement assist 292 are formed in a continuous and substantial sine wave shape in a side view.

The conductor joining device 1x configured in this manner can ultrasonically join the conductor exposed portions 220 formed in a corrugated shape not only along the width direction Y but also along the up-down direction Z, so that the conductor joining device 1x can manufacture a joined conductor 100x in which not only are the corrugated portions 140 formed on the first surface 121 and the second surface 122 that face each other along the width direction Y, but also upper and lower side corrugated portions 170 are formed on a third surface 131 and a fourth surface 132 facing each other along the up-down direction Z.

Hereinafter, the joined conductor 100x will be briefly described based on FIG. 14 to FIGS. 16A to 16D.

Figure 14:
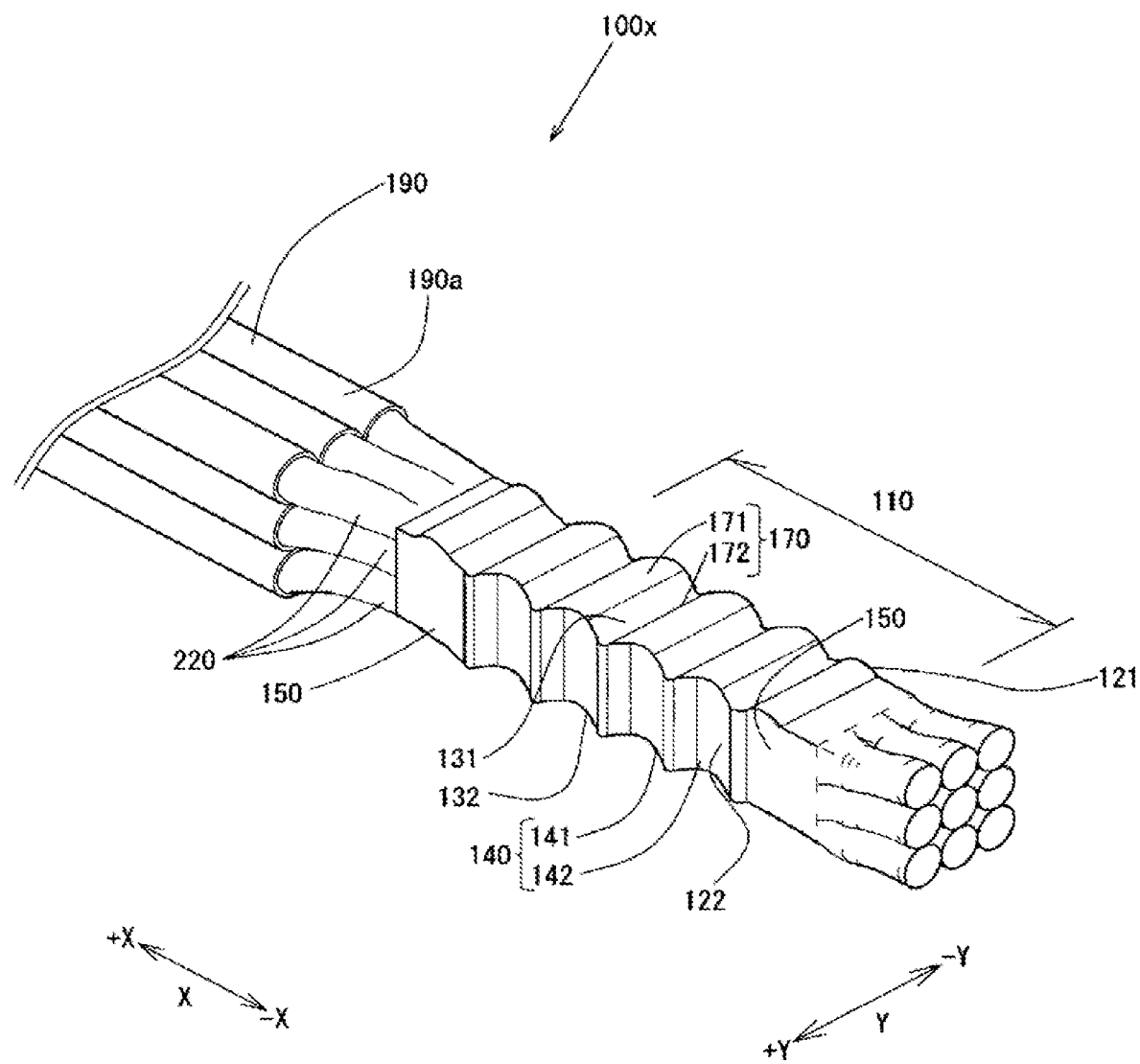
FIG. 14 is a schematic perspective view of a joined conductor according to still another embodiment.
Figure 15A:
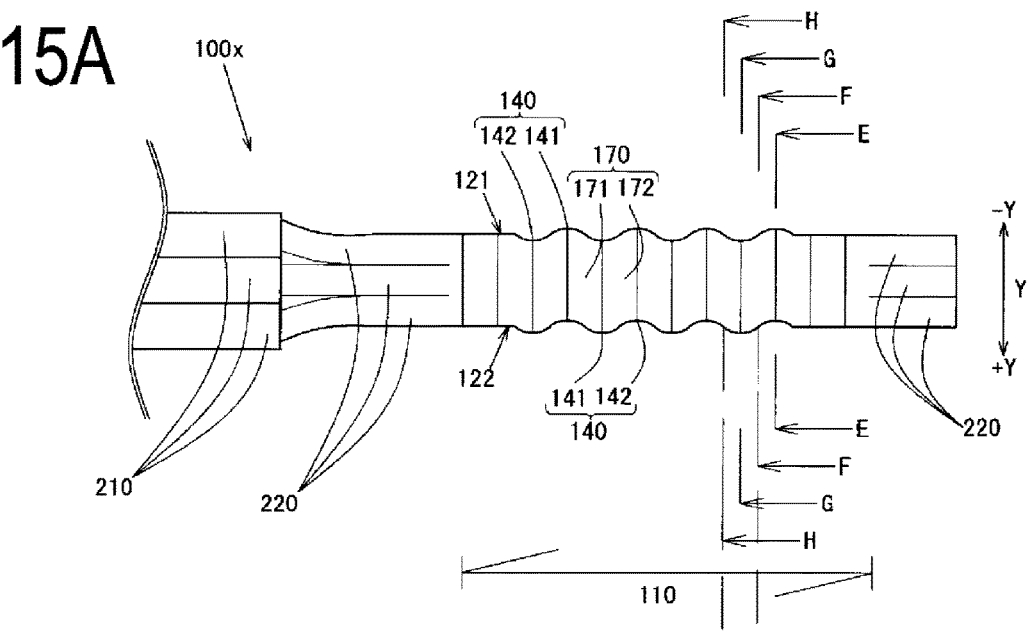
FIGS. 15A and 15B are explanatory diagrams of the joined conductor according to still another embodiment.
Figure 15B:
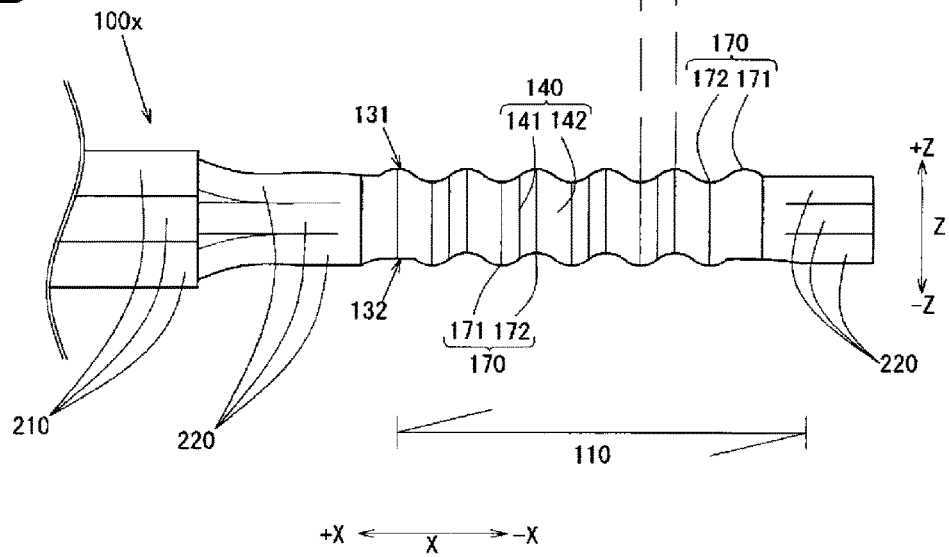

Here, FIG. 14 illustrates a schematic perspective view of the joined conductor 100x, and FIGS. 15A and 15B illustrate a plan view (FIG. 15A) and a side view (FIG. 15B) of the joined conductor 100x. FIGS. 16A to 16D illustrate a cross-sectional plan view taken along an E-E line (FIG. 16A), a cross-sectional plan view taken along an F-F line (FIG. 16B), a cross-sectional plan view taken along a G-G line (FIG. 16C), and a cross-sectional plan view taken along an H-H line (FIG. 16D) in FIG. 15A.

As illustrated in FIG. 14 and FIGS. 15A and 15B, in the joined conductor 100x, not only are the corrugated portions 140 formed on the first surface 121 and the second surface 122, but also four of the upper and lower side corrugated portions 170 (corresponding to the intersecting-side corrugated portions) having a corrugated shape are continuously provided on the third surface 131 and the fourth surface 132 along the longitudinal direction X, and are formed in a sine wave shape in a side view.

More specifically, the upper and lower side corrugated portion 170 includes an upper and lower side ridge 171 (corresponding to the intersecting-side convex line portion) protruding outward in the up-down direction Z with respect to the third surface 131, and the upper and lower side valley 172 (corresponding to the intersecting-side concave line portion) recessed inward in the up-down direction Z with respect to the third surface 131, and the upper and lower side ridges 171 and the upper and lower side valleys 172 are continuously alternately arranged.

Figure 16A:
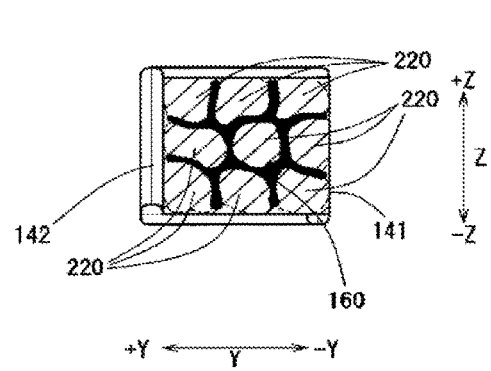
FIGS. 16A to 16D are explanatory diagrams of the joined conductor according to still another embodiment.
Figure 16B:
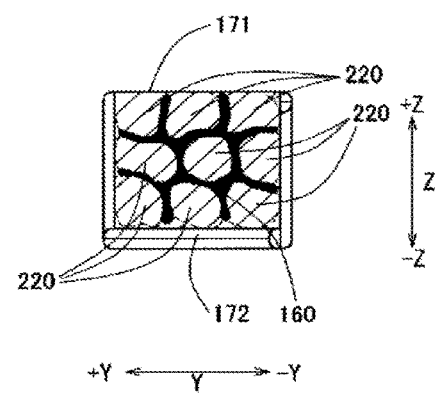
Figure 16C:
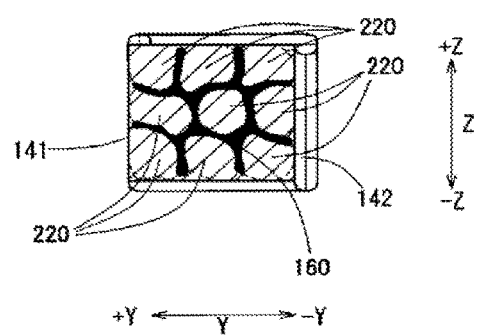
Figure 16D:
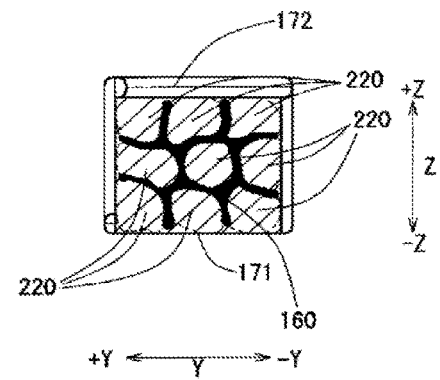

As illustrated in FIGS. 16A to 16D, as the joined conductor 100x configured in this manner goes from −X toward +X along the longitudinal direction X, a state of the joined conductor 100x shifts from a state where the ridge 141 protrudes toward the −Y side in the width direction Y (see FIG. 16A) to a state where the ridge 141 does not protrude (see FIG. 16B), then passes through a state where the ridge 141 protrudes toward the +Y side (see FIG. 16C), and becomes a state where the ridge 141 does not protrude (see FIG. 16D).

Similarly, as for the up-down direction Z, as the jointed conductor 100x goes from −X toward +X along the longitudinal direction X, the state shifts from a state where the upper and lower side ridge 171 protrudes toward the side (see FIG. 16B) to a state where the upper and lower side ridge 171 protrudes upward (+Z side) (see FIG. 16B), then passes through a state where the upper and lower side ridge 171 does not protrude (see FIG. 16C), and becomes a state where the upper and lower side ridge 171 protrudes downward (−Z side) (see FIG. 16D).

In other words, as the joined conductor 100x goes from −X toward +X along the longitudinal direction X, since the ridges 141 and the upper and lower side ridges 171 which are protruding portions protrude in a spiral manner, an apparent cross-sectional coefficient can be further improved than that of the joined conductor 100 and rigidity can be improved.

Note that the corrugated bottom surface portion 13b which is the bottom surface of the horn 13 and the anvil-side upper surface 322 are configured so as to be respectively provided with the horn valley in width direction 14c and the horn ridge in width direction 15c, and the compression-side corrugated portion 37, but a configuration may be adopted in which the compression-side corrugated portion 37 is provided only on the anvil-side upper surface 322, for example.

In this manner, the up-down side corrugated portions 170 that have a corrugated shape and in which the upper and lower side ridges 171 protruding outward and the regulating portion-side valleys 272 recessed inward are continuous along longitudinal direction on the third surface 131 and the fourth surface 132 of a pair of side surfaces in up-down direction 130 facing in the orthogonal cross section, so that the contact area and the joining strength between the conductor exposed portions 220 aligned and arranged in the width direction Y and the up-down direction Z are increased. That is, since the contact area and the joining strength between the conductor exposed portions 220 are increased, the integrity of the joined conductor 100 can be further improved, and the electrical conductivity of the joined conductor 100 can be further improved.

In addition, the corrugated regulating portion 27 may be formed on both of or only one of the pair of regulating surfaces 26. Furthermore, the corrugated regulating portion 27 may be formed on the entire regulating surface 26 or a part of the regulating surface 26.

Furthermore, regarding the regulating portion 27, it is sufficient that at least one or more of the regulating portion-side ridges 271 and at least one or more the regulating portion-side valleys 272 are continuous along the longitudinal direction X, and for example, as long as at least one or more of the regulating portion-side ridges 271 and at least one or more of the regulating portion-side valleys 272 are continuous, the number of the regulating portion-side ridges 271 and the regulating portion-side valleys 272 do not need to be coincident.

REFERENCE SIGNS LIST

13a Horn-Side lower surface
100 Joined conductor
110 Joining portion
121 First surface
122 Second surface
131 Third surface
132 Fourth surface
140 Corrugated portion
140L Corrugated portion
140R Corrugated portion
141 Ridge
142 Valley
150 Planar portion
170 Upper and lower side corrugated portion
171 Upper and lower side ridge
172 Upper and lower side valley
220 Conductor exposed portion
271 Regulating portion-side convex portion
272 Regulating portion-side concave portion
27R Corrugated regulating portion
27L Corrugated regulating portion
322 Anvil-side upper surface
331 Anvil-side convex portion
332 Anvil-side concave portion
s1 Electric wire arrangement configuration
s2 Compression and movement step
s3 Conductor compressing step
s4 Ultrasonic welding step
X Longitudinal direction
Y Width direction
Z Up-down direction

The invention claimed is:

1. A joined conductor comprising:
a joining portion in which a plurality of conductors arranged along a longitudinal direction are fused and joined, wherein
the joining portion comprises:
a first surface and a second surface that face each other along the longitudinal direction; and
on at least one of the first surface and the second surface,
a corrugated portion in which a convex line portion protruding outward in a facing direction in which the first surface and the second surface face each other, and a concave line portion recessed inward in the facing direction are continuously provided along the longitudinal direction.

2. The joined conductor according to claim 1, wherein
the corrugated portion is provided on each of the first surface and the second surface, and
the convex line portion on the first surface faces the concave line portion on the second surface, and the concave line portion on the first surface faces the convex line portion on the second surface.

3. The joined conductor according to claim 1, wherein
a plurality of the corrugated portions are provided along the longitudinal direction.

4. The joined conductor according to claim 1, wherein
a height from a bottom of the concave line portion to a vertex of the convex line portion is configured to be less than or equal to than 0.5 times an interval between the first surface and the second surface.

5. The joined conductor according to claim 1, wherein
a height from a bottom of the concave line portion to a vertex of the convex line portion is configured to be more than or equal to 0.5 times a minimum diameter of the plurality of conductors that are arranged.

6. The joined conductor according to claim 1, wherein
the joining portion comprises:
a planar portion formed in a planar shape along the longitudinal direction between a tip of the joining portion and the corrugated portion.

7. The joined conductor according to claim 1, wherein
the joining portion is formed by ultrasonic welding.

8. The joined conductor according to claim 1, wherein
the conductors are made of aluminum or aluminum alloy.

9. The joined conductor according to claim 1, wherein
the joining portion comprises:
a third surface intersecting the first surface and the second surface along the longitudinal direction; and
on the third surface,
an intersecting-side corrugated portion in which an intersecting-side convex line portion protruding outward in an intersecting direction that intersects with the facing direction, and an intersecting-side concave line portion recessed inward in the facing direction are continuously provided along the longitudinal direction.

10. A method for manufacturing a joined conductor in which a plurality of conductors arranged along a longitudinal direction are fused and joined, the method comprising the steps of:
when a direction orthogonal to the longitudinal direction is referred to as a first direction, and a direction orthogonal to the longitudinal direction and the first direction is referred to as a second direction,
compressing the conductors along the first direction and regulating movement of the conductors in the second direction; and welding that performs ultrasonic welding of the conductors compressed in the first direction by ultrasonic oscillation, wherein the compressing comprises the step of:

regulating movement of the conductors in the second direction such that a corrugated portion is formed along the longitudinal direction on a first surface provided on a conductor bundle configured of the plurality of conductors that are arranged, and the corrugated portion is continuously provided with a convex line portion protruding outward in the second direction, and a concave line portion recessed inward in the second direction.

11. A conductor joining device for joining a plurality of conductors by ultrasonic welding, the conductor joining device comprising:

a horn having a contact surface that is brought into contact with the conductors and configured to ultrasonically oscillate;

an anvil configured to relatively move in a movement direction of approaching to or separating from the contact surface; and a pair of regulating portions configured to be in contact with the contact surface and configured to be relatively movable along the contact surface, wherein the regulating portions have regulating surfaces that face each other, and in a case where a direction in which a pair of the regulating surfaces face each other is referred to as a facing direction, and a direction orthogonal to the movement direction is referred to as an orthogonal direction, on at least one of the regulating surfaces, a corrugated regulating portion in which a convex portion protruding toward another regulating surface facing the one regulating surface, and a concave portion recessed in a direction opposite to a protruding direction of the convex portion are continuously provided along the orthogonal direction is formed on a main surface facing in the facing direction of the anvil, an engaging concave portion and an engaging convex portion configured to engage with the convex portion and the concave portion are provided along the orthogonal direction, and at least one of the pair of regulating portions with respect to the anvil moves toward another of the pair of regulating portions so as to sandwich the anvil between the regulating portions facing each other, and the horn relatively moves with respect to the anvil.

12. A conductor joining method, the method comprising the steps of:

arranging a plurality of conductors in a space formed by a horn having a contact surface that is brought into contact with the conductors, and configured to ultrasonically oscillate, and a pair of regulating portions configured to be in contact with the contact surface, arranged so as to face each other at a predetermined interval, and configured to relatively move along the contact surface;

relatively moving the horn and the pair of regulating portions with respect to an anvil arranged at a predetermined interval with respect to the contact surface and moving at least one of the pair of regulating portions toward another of the regulating portions so as to sandwich the anvil between the pair of regulating portions facing each other, and compressing the conductors by the anvil and the horn with the pair of regulating portions sandwiching the anvil; and performing ultrasonic welding the conductors compressed by the anvil and the horn by making the horn ultrasonically oscillate, wherein on each of regulating surfaces facing each other in the pair of regulating portions, a corrugated regulating portion in which a convex portion protruding toward another regulating surface facing the regulating surface, and a concave portion recessed in a direction opposite to a protruding direction of the convex portion are continuously provided along a facing direction in which the pair of regulating portions face each other and an orthogonal direction orthogonal to a movement direction in which the horn relatively moves with respect to the anvil is formed, and an engaging concave portion and an engaging convex portion configured to engage with the convex portion and the concave portion are provided on a main surface facing in the facing direction of the anvil.

* * * * *